(12) United States Patent
Itakura et al.

(10) Patent No.: US 7,518,680 B2
(45) Date of Patent: Apr. 14, 2009

(54) ACTIVE MATRIX TYPE LIQUID CRYSTAL DISPLAY

(75) Inventors: Kunimasa Itakura, Tokyo (JP); Eriko Fujimaki, Tokyo (JP)

(73) Assignee: NEC LCD Technologies, Ltd. (JP)

( * ) Notice: Subject to any disclaimer, the term of this patent is extended or adjusted under 35 U.S.C. 154(b) by 44 days.

(21) Appl. No.: 11/607,400

(22) Filed: Dec. 1, 2006

(65) Prior Publication Data

US 2007/0076154 A1 Apr. 5, 2007

Related U.S. Application Data

(62) Division of application No. 10/330,848, filed on Dec. 27, 2002, now Pat. No. 7,164,458.

(30) Foreign Application Priority Data

Dec. 27, 2001 (JP) ............................. 2001-396058

(51) Int. Cl.
  *G02F 1/1335* (2006.01)
  *G02F 1/1343* (2006.01)
(52) U.S. Cl. ...................... 349/119; 349/117; 349/118; 349/141
(58) Field of Classification Search ................ 349/141, 349/117–121
  See application file for complete search history.

(56) References Cited

U.S. PATENT DOCUMENTS 6,115,095 A * 9/2000 Suzuki et al. ............... 349/141
6,285,430 B1 * 9/2001 Saito .......................... 349/141
6,667,787 B2 * 12/2003 Umemoto ..................... 349/96

FOREIGN PATENT DOCUMENTS

| JP | 09-080424 | 3/1997 |
|---|---|---|
| JP | H09-203894 | 8/1997 |
| JP | H10-307291 | 11/1998 |
| JP | H11-231306 | 8/1999 |
| JP | 11-305217 | 11/1999 |
| JP | H11-305217 | 11/1999 |
| JP | 2001-350022 | 12/2001 |
| JP | 2002-55341 | 2/2002 |

* cited by examiner

*Primary Examiner*—Michael H Caley
(74) *Attorney, Agent, or Firm*—Muirhead and Saturnelli, LLC

(57) ABSTRACT

Disclosed is an in-plane switching active matrix type liquid crystal display with greater improvements on color shifting and contrast. The liquid crystal display comprises an in-plane switching type liquid crystal display panel having an active device substrate, an opposing substrate and a liquid crystal layer held sandwiched between the active device substrate and the opposing substrate, a first polarizer laid out on one side of the liquid crystal display panel, a second polarizer laid out on the opposite side of the liquid crystal display panel, first to third optical compensators placed in order between the liquid crystal display panel and the first polarizer, and a fourth optical compensator placed between the liquid crystal display panel and the second polarizer. As the first to fourth optical compensators are provided to compensate for retardation of the liquid crystal layer and retardation of the polarizers, black stretching does not occur even when observation is made from any viewing angle, and a reduction in contrast does not occur. Nor does color shifting occur at the time of displaying black.

6 Claims, 24 Drawing Sheets

CONTRAST RATIO : 800, 400, 200, 100, 50, 20 10 AND 5 IN ORDER FROM THE CENTER

VIEWING ANGLE : THE CENTER IS THE FRONT VIEW FIELD CONCENTRIC CIRCLES HAVE VIEWING ANGLES OF 20°, 40°, 60° AND 80° IN ORDER FROM INSIDE

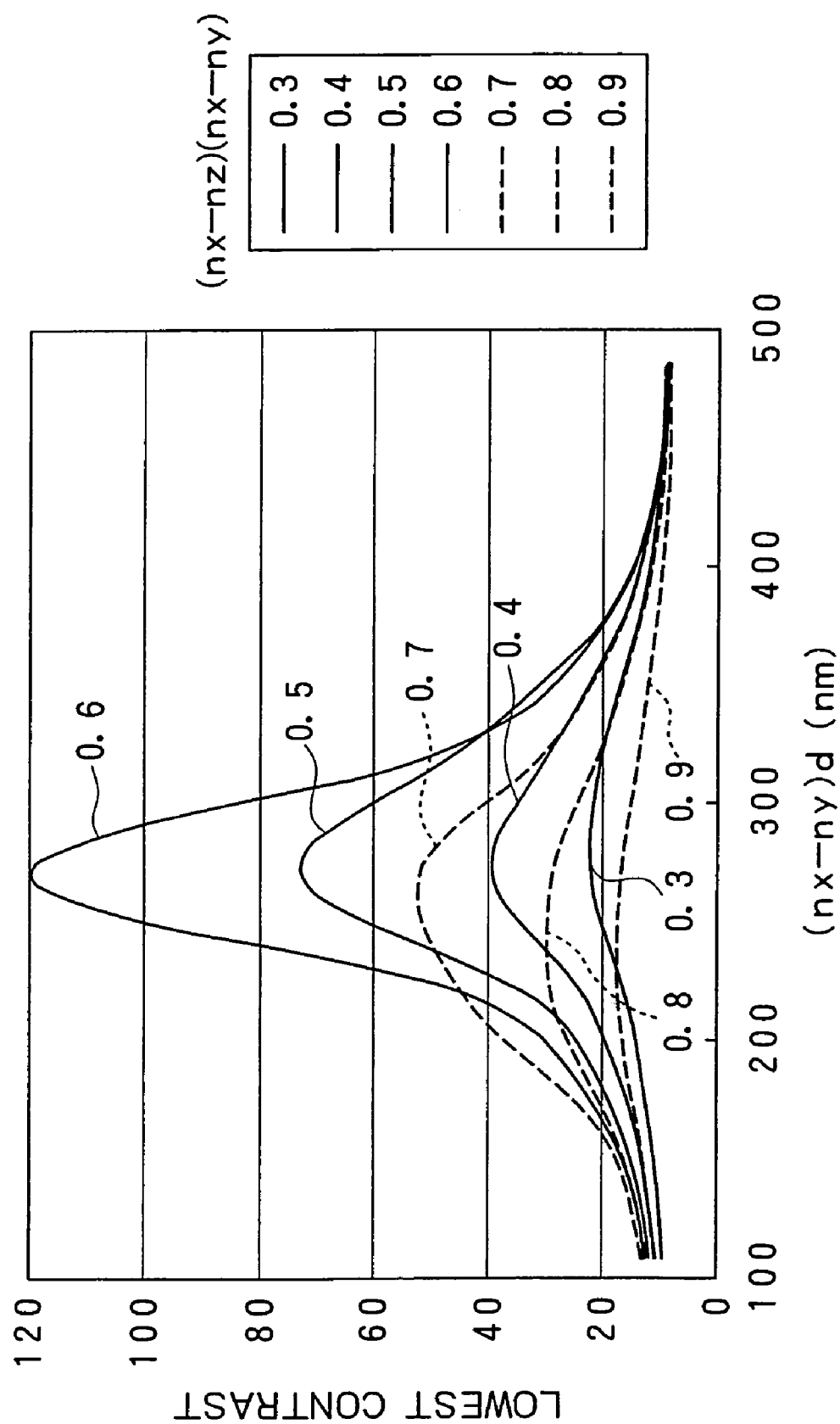

ACTIVE MATRIX TYPE LIQUID CRYSTAL DISPLAY

CROSS REFERENCE TO RELATED APPLICATIONS

This application is a divisional of U.S. Application No. 10/330,848, filed Dec. 27, 2002 now U.S. Pat. No. 7,164,458.

BACKGROUND OF THE INVENTION

1. Field of the Invention

The present invention relates to an in-plane switching (IPS) active matrix type liquid crystal display, and, more particularly, to a liquid crystal display which suppresses a reduction in contrast and color shifting when the viewing angle changes.

2. Description of the Related Art

An IPS liquid crystal display presents image display by forming an electric field, parallel to a liquid crystal substrate, between pixel electrodes and a common electrode, and has an advantage of providing a wider viewing angle over the TN mode type or the like, which forms an electric field perpendicular to the substrate. FIG. 1 shows the structure of a conventional IPS active matrix type liquid crystal display. As shown in FIG. a1, the liquid crystal display has a liquid crystal display (LCD) panel 10, a first polarizer 31 laid out on the top side of the LCD panel 10 and a second polarizer 32 laid out on the bottom side of the LCD panel 10. The LCD panel 10 comprises an active device substrate 11 on which scan lines 111, data lines 112, thin film transistors (TFTs) 113, pixel electrodes 114, a common electrode 115, a common electrode line 116, etc. are formed, an opposing substrate 12 on which a black matrix 121, color layers (color filters) 122, etc. are formed, and a liquid crystal layer 13 held sandwiched between the active device substrate 11 and the opposing substrate 12. As shown in FIG. 2A which is an exemplary cross-sectional view of the conventional IPS active matrix type liquid crystal display and FIG. 2B which shows the alignment direction of the liquid crystal layer 13 and the directions of adsorption axes of the first and second polarizers 31 and 32, the direction of the adsorption axis of the first polarizer 31 is set perpendicular to the alignment direction of the liquid crystal layer 13 and the direction of the adsorption axis of the second polarizer 32 is set parallel to the alignment direction of the liquid crystal layer 13.

According to the conventional IPS active matrix type liquid crystal display, the liquid crystal layer 13 has a birefringence if the viewing angle is changed even when no electric field is applied to the liquid crystal layer 13, so that the adsorption axes of the polarizers 31 and 32 do not appear to perpendicularly cross each other as observation is made obliquely. That is, the LCD panel 10 in a black display state causes a birefringence effect due to the apparent deviation between the alignment direction and the polarization plane that is caused by oblique observation of the liquid crystal layer 13. In case of oblique observation, the birefringence of the protection layer of the polarizer influences polarized light that passes the liquid crystal display. The polarizer comprises a polarization layer formed of a material having a polarization property and a protection layer which protects the polarization layer. It is known that triacetyl cellulose which is generally used to form the protection layer has an optical anisotropy during the fabrication process of the polarizer. The optical anisotropy causes birefringence with respect to light which passes the liquid crystal display at the time the viewing angle of the liquid crystal display is changed, thereby degrading the viewing angle characteristic. Such degradation increases the luminance in a dark state in case of conducting oblique observation, thus lowering the contrast. FIG. 3A shows the results of actually measuring the viewing angle characteristic for the contrast of the conventional liquid crystal display. As seen from the diagram, there is an area with a contrast of less than 5 as observation is made obliquely.

In case where oblique observation is made, the optical path becomes longer as will be discussed later with reference to FIG. 5B, so that the apparent retardation of the liquid crystal layer changes. When the viewing angle is changed, therefore, the wavelength of light which passes the liquid crystal display varies so that the colors on the screen look changed, thus causing so-called color shifting that depends on the direction of observation. FIG. 3B shows the results of measuring the viewing angle characteristic for the chromaticity of the conventional liquid crystal display with the conventional structure. As apparent from the diagram, the chromaticity varies significantly with a change in viewing angle. FIGS. 3A and 3B respectively correspond to FIGS. 6A and 6B.

Various schemes have been proposed to prevent a reduction in contrast and color shifting that depend on the viewing angle of such a conventional IPS type liquid crystal display. For example, Japanese Patent Laid-Open No. 133408/1999 has proposed a scheme of intervening a compensation layer having an optical anisotropy between a liquid crystal layer and a pair of polarizers which sandwich the liquid crystal layer. While this scheme effectively works on color shifting, however, the publication fails to mention that the scheme improves the contrast. Japanese Patent Laid-Open No. 2001-242462 has proposed a scheme of intervening first and second retardation plates between a liquid crystal layer and a pair of polarizers which sandwich the liquid crystal layer. Although the publication describes that the scheme effectively improves color shifting and the contrast, higher improvements are desirable.

SUMMARY OF THE INVENTION

Accordingly, it is an object of the invention to provide an in-plane switching active matrix type liquid crystal display with greater improvements on color shifting and contrast, as compared with the prior art.

An active matrix type liquid crystal display according to the invention comprises an in-plane switching type liquid crystal display panel having an active device substrate, an opposing substrate and a liquid crystal layer held sandwiched between the active device substrate and the opposing substrate; a first polarizer laid out on one side of the liquid crystal display panel; a second polarizer laid out on the opposite side of the liquid crystal display panel; an optical compensator, placed between the first polarizer and the second polarizer, for compensating for retardation of the liquid crystal layer; and another optical compensator, placed between the first polarizer and the second polarizer, for compensating for retardation of the first or second polarizer.

In the liquid crystal display, each of the optical compensators may be comprised of a single optical compensator or a plurality of optical compensators. Each of the optical compensators may be located either between the liquid crystal display panel and the first polarizer or between the liquid crystal display panel and the second polarizer, or both. In this case, each of absorption axes of the first and second polarizers may be set parallel to or perpendicular to an alignment direction of the liquid crystal layer and a direction of a refractive index nx of each of the optical compensators may be set parallel to or perpendicular to the alignment direction of the liquid crystal layer.

According to the first mode of the invention, the first polarizer is laid out on an opposing substrate side of the liquid crystal display panel, first to third optical compensators are laid out in order between the liquid crystal display panel and the first polarizer from a liquid crystal display panel side, a fourth optical compensator is laid out between the liquid crystal display panel and the second polarizer, a direction of each of refractive indexes nx of the first to third optical compensators is set parallel to or perpendicular to an alignment direction of the liquid crystal layer, and a direction of a refractive index nx of the fourth optical compensator is set parallel to or perpendicular to the alignment direction of the liquid crystal layer.

In this mode, an absorption axis of the first polarizer may be set perpendicular to the alignment direction of the liquid crystal layer and an absorption axis of the second polarizer may be set parallel to the alignment direction of the liquid crystal layer. The direction of the refractive index nx of the first optical compensator may be set parallel to the alignment direction of the liquid crystal layer, the direction of the refractive index nx of the second optical compensator may be set perpendicular to the alignment direction of the liquid crystal layer, the direction of the refractive index nx of the third optical compensator may be set parallel to a direction of the absorption axis of the first polarizer and the direction of the refractive index nx of the fourth optical compensator may be set parallel to a direction of the absorption axis of the second polarizer.

According to the second mode of the invention, the first polarizer is laid out on an opposing substrate side of the liquid crystal display panel, first and second optical compensators are laid out in order between the liquid crystal display panel and the first polarizer from a liquid crystal display panel side, third and fourth optical compensators are laid out in order between the liquid crystal display panel and the second polarizer from the liquid crystal display panel side, a direction of each of refractive indexes nx of the first and second optical compensators is set parallel to or perpendicular to an alignment direction of the liquid crystal layer, and a direction of each of refractive indexes nx of the third and fourth optical compensators is set parallel to or perpendicular to the alignment direction of the liquid crystal layer.

In this mode, an absorption axis of the first polarizer may be set perpendicular to the alignment direction of the liquid crystal layer and an absorption axis of the second polarizer may be set parallel to the alignment direction of the liquid crystal layer. The direction of the refractive index nx of the first optical compensator may be set perpendicular to the alignment direction of the liquid crystal layer, the direction of the refractive index nx of the second optical compensator may be set parallel to a direction of the absorption axis of the first polarizer, the direction of the refractive index nx of the third optical compensator may be set parallel to the alignment direction of the liquid crystal layer, and the direction of the refractive index nx of the fourth optical compensator may be set parallel to a direction of the absorption axis of the second polarizer.

According to the third mode of the invention, the first polarizer is laid out on an opposing substrate side of the liquid crystal display panel, first and second optical compensators are laid out in order between the liquid crystal display panel and the first polarizer from a liquid crystal display panel side, and a direction of each of refractive indexes nx of the first and second optical compensators is set parallel to or perpendicular to an alignment direction of the liquid crystal layer.

In this mode, an absorption axis of the first polarizer may be set perpendicular to the alignment direction of the liquid crystal layer and an absorption axis of the second polarizer may be set parallel to the alignment direction of the liquid crystal layer. The direction of the refractive index nx of the first optical compensator may be set parallel to the alignment direction of the liquid crystal layer, and the direction of the refractive index nx of the second optical compensator may be set perpendicular to the alignment direction of the liquid crystal layer.

According to a modification of the third mode of the invention, the second polarizer is laid out on an active device substrate side of the liquid crystal display panel, first and second optical compensators are laid out in order between the liquid crystal display panel and the second polarizer from a liquid crystal display panel side, and a direction of each of refractive indexes nx of the first and second optical compensators is set parallel to or perpendicular to an alignment direction of the liquid crystal layer.

In the modification, an absorption axis of the first polarizer may be set parallel to the alignment direction of the liquid crystal layer and an absorption axis of the second polarizer may be set perpendicular to the alignment direction of the liquid crystal layer. The direction of the refractive index nx of the first optical compensator may be set parallel to the alignment direction of the liquid crystal layer, and the direction of the refractive index nx of the second optical compensator may be set perpendicular to the alignment direction of the liquid crystal layer.

According to the fourth mode of the invention, the first polarizer is laid out on an opposing substrate side of the liquid crystal display panel, a first optical compensator is laid out between the liquid crystal display panel and the first polarizer, a second optical compensator is laid out between the liquid crystal display panel and the second polarizer, and a direction of each of refractive indexes nx of the first and second optical compensators is set parallel to or perpendicular to an alignment direction of the liquid crystal layer.

In this mode, an absorption axis of the first polarizer may be set perpendicular to the alignment direction of the liquid crystal layer and an absorption axis of the second polarizer may be set parallel to the alignment direction of the liquid crystal layer. The direction of the refractive index nx of the first optical compensator may be set perpendicular to the alignment direction of the liquid crystal layer, and the direction of the refractive index nx of the second optical compensator may be set parallel to the alignment direction of the liquid crystal layer.

As the liquid crystal display according to the invention is provide with the optical compensator which compensates for retardation of the liquid crystal layer and the optical compensator which compensates for retardation of the first or second polarizer, black stretching does not occur even when observation is made from any viewing angle, and a reduction in contrast does not occur. Nor does color shifting occur at the time of displaying black.

BRIEF DESCRIPTION OF THE DRAWINGS

FIG. 7 is a contrast characteristic diagram with retardation as a parameter;

DETAILED DESCRIPTION OF THE PREFERRED EMBODIMENTS

Preferred embodiments of the invention will be described below with reference to the accompanying drawings.

First Embodiment

Example 1 of First Embodiment

Figure 1:
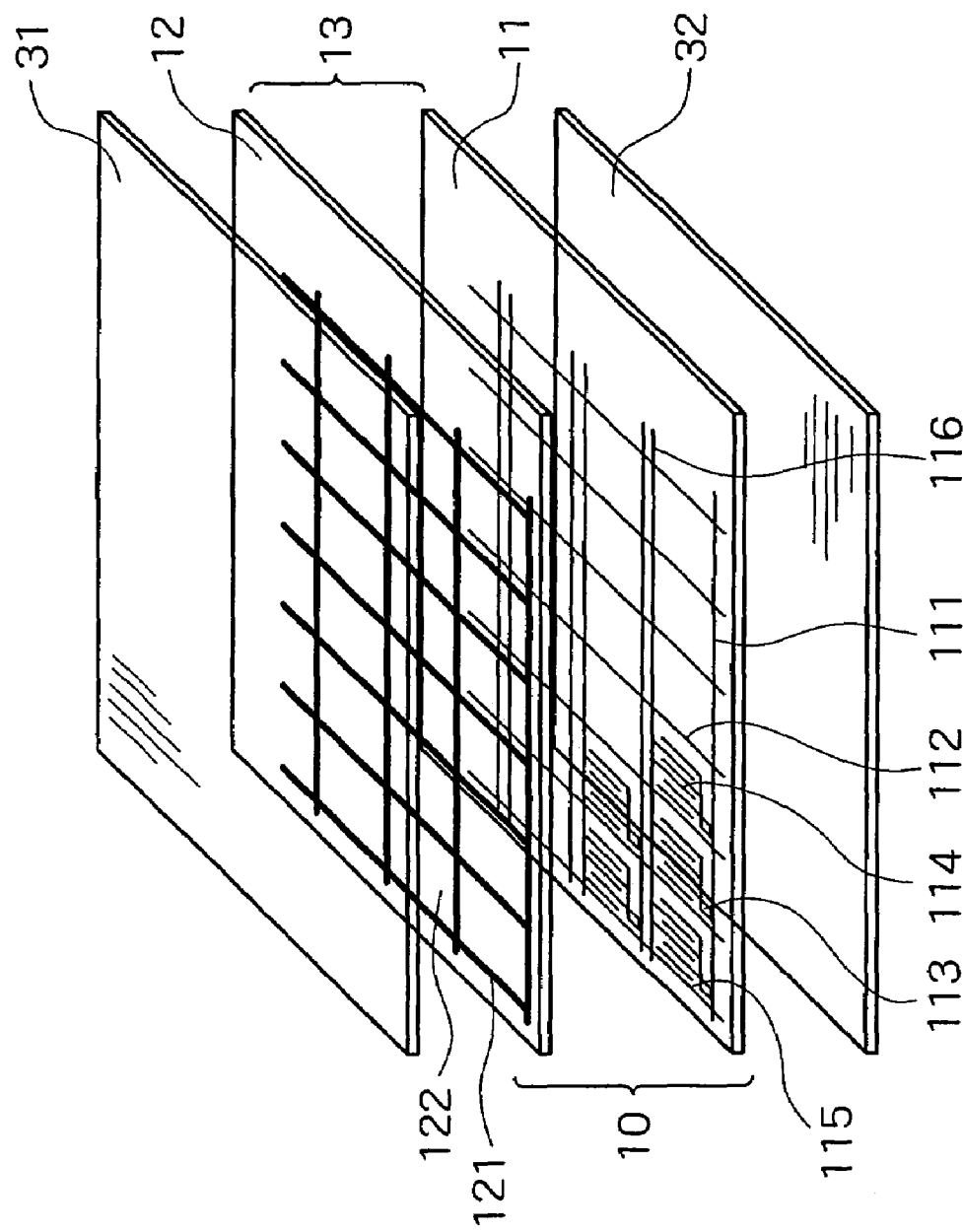
FIG. 1 is a perspective view showing the schematic structure of a conventional IPS active matrix type liquid crystal display.
Figure 2A:
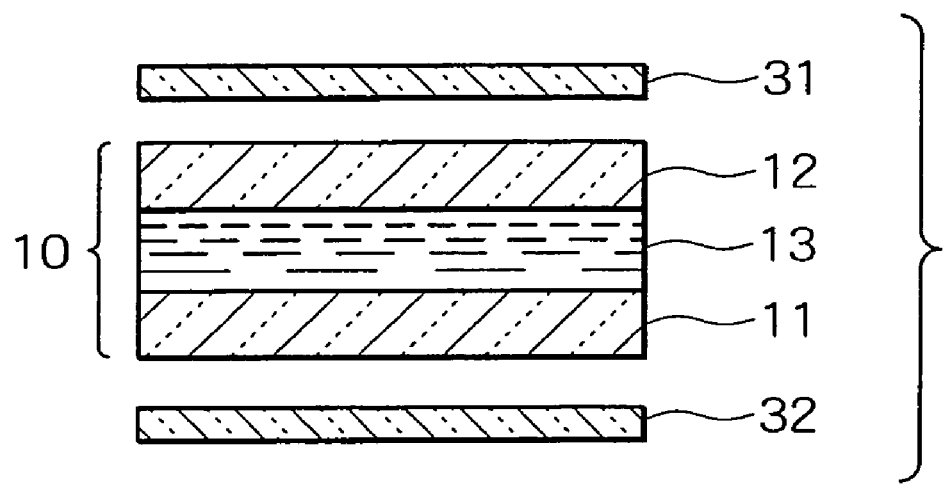
FIGS. 2A and 2B are diagrams exemplarily illustrating the conventional liquid crystal display.
Figure 2B:
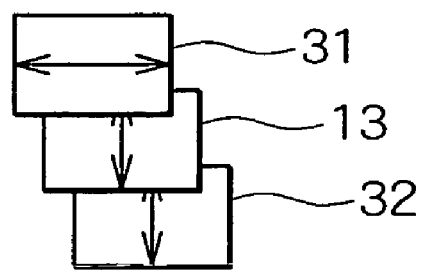
Figure 3A:
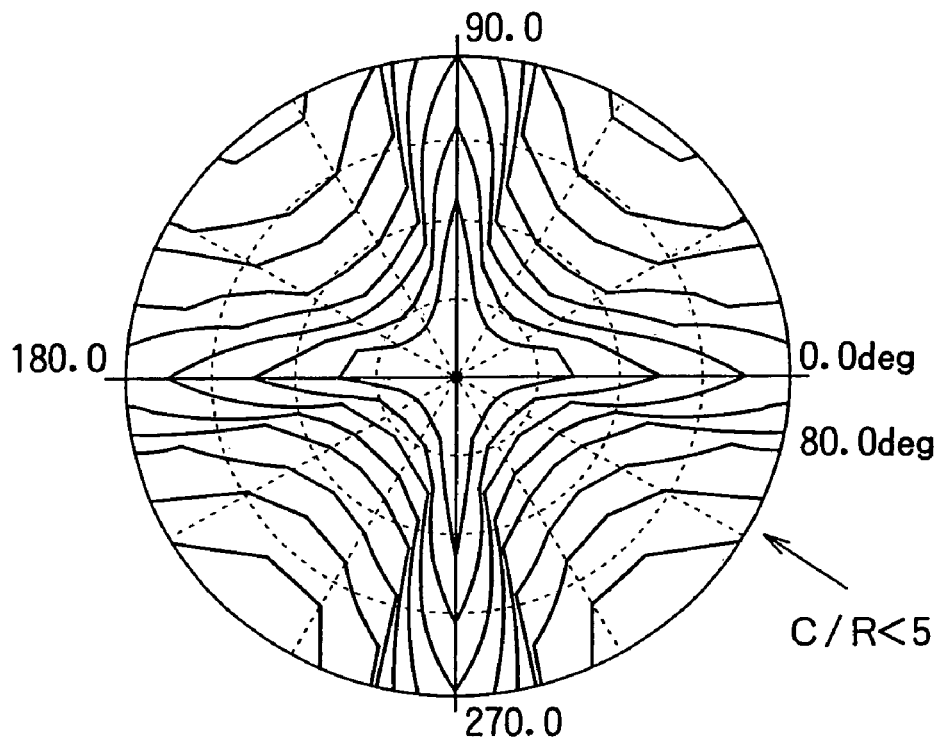
FIGS. 3A and 3B are viewing angle characteristic charts for the contrast and chromaticity according to the conventional liquid crystal display.
Figure 3B:
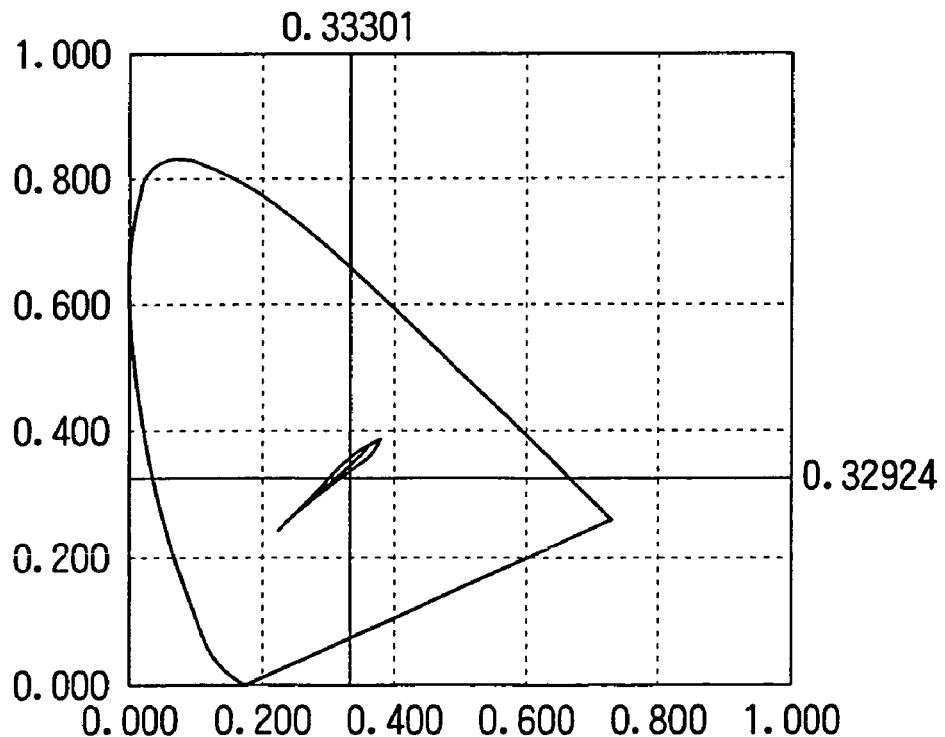
Figure 4A:
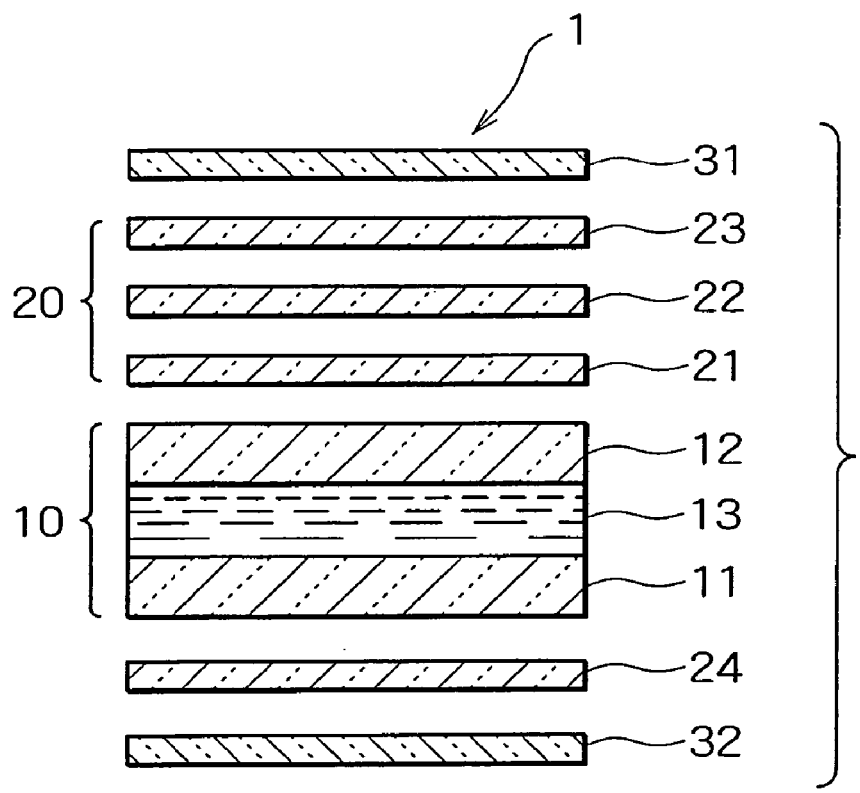
FIGS. 4A and 4B are diagrams exemplarily illustrating an IPS active matrix type liquid crystal display according to Example 1 of a first embodiment of the invention.
Figure 4B:
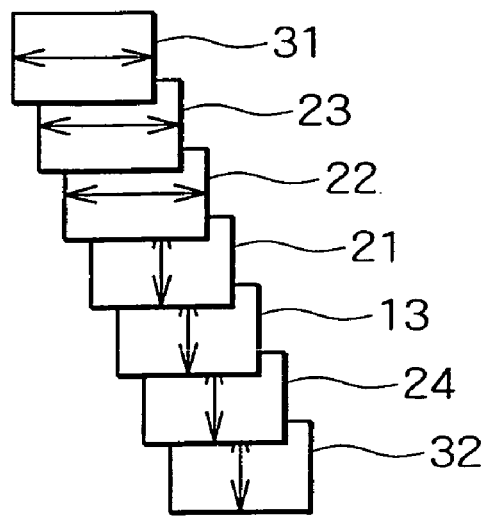

FIGS. 4A and 4B illustrate the structure of an in-plane switching type (IPS) active matrix type liquid crystal display 1 according to Example 1 of the first embodiment of the invention. FIG. 4A is an exemplary diagram showing the lamination structure of the liquid crystal display 1 and FIG. 4B is a diagram exemplarily showing the alignment directions and optical axes of individual layers. As shown in the diagrams, the liquid crystal display 1 has a liquid crystal display (LCD) panel having an active device substrate 11, an opposing substrate 12 and a liquid crystal layer 13 held sandwiched between the active device substrate 11 and the opposing substrate 12. Provided on outside of the LCD panel 10 on the opposing substrate side is an optical compensator group 20 which has first to third optical compensators 21 to 23 arranged outward from inside in order. A first polarizer 31 is laid out outside the optical compensator group 20. A fourth optical compensator 24 is provided on outside of the LCD panel 10 on the active device substrate side and a second polarizer 32 is arranged outside the fourth optical compensator 24.

In the following description, the up and down direction and the left and right direction of the screen in case where an observer out of the diagrams makes a frontward observation of the liquid crystal display will be called "vertical direction" and "horizontal direction", respectively. Further, the direction in which the opposing substrate 12 is located and the direction in which the active device substrate 11 is located will be called "top side" and "bottom side", respectively, with respect to the observer observing the LCD panel 10.

Referring to FIG. 4B, the liquid crystal of the liquid crystal layer 13 is aligned nearly parallel to both substrates 11 and 12, and the retardation, $\Delta \cdot d$, of the liquid crystal layer 13 is 310 nm. With the alignment direction of the liquid crystal layer 13 being the vertical direction of the screen, the direction of the absorption axis of the first polarizer 31 (the optical axis in a direction perpendicular to the direction in which polarized light passes) is set perpendicular to the alignment direction of the liquid crystal layer 13. The direction of the absorption axis of the second polarizer 32 is set parallel to the alignment direction of the liquid crystal layer 13.

The direction of the refractive index nx of the first optical compensator 21 is set parallel to the alignment direction of the liquid crystal layer 13. The direction of the refractive index nx of the second optical compensator 22 is set perpendicular to the alignment direction of the liquid crystal layer 13. The direction of the refractive index nx of the third optical compensator 23 is set parallel to the direction of the absorption axis of the first polarizer 31. The direction of the refractive index nx of the fourth optical compensator 24 is set parallel to the direction of the absorption axis of the second polarizer 32.

Each of the optical compensators 21 to 24 has refractive indexes nx and ny in the x direction and y direction in a plane, and a refractive index nz in a thickness direction. Further, d is the film thickness of each of the optical compensators 21 to 24 in a direction perpendicular to the screen. As the characteristics of the first optical compensator 21, the retardation (nx−ny)d was set equal to −380 nm and (nx−nz)/(nx−ny) was set equal to 1.05. As the characteristics of the second optical compensator 22, the retardation (nx−ny)d was set equal to 314 nm and (nx−nz)/(nx−ny) was set equal to 0.538. For both of the third optical compensator 23 and the fourth optical compensator 24, the retardation (nx−ny)d was set equal to −6 nm and (nx−nz)/(nx−ny) was set equal to 8.3.

When one observes the liquid crystal display 1 with the structure shown in FIGS. 4A and 4B from the front side, with no electric field applied to the liquid crystal layer 13, the optical axes (alignment directions and adsorption axes) of all of the polarizers 31 and 32, the optical compensators 21 to 24 and the liquid crystal layer 13 are positioned parallel or perpendicular. Therefore, light polarized by the second polarizer 32 reaches the first polarizer 31 without being influenced at all and the polarization plane of the polarized light coincides with the direction of the absorption axis of the first polarizer 31, thus making a dark state. The state in which no electric field is applied to the liquid crystal layer 13 is called a "black display state".

As mentioned earlier, a polarizer comprises a polarization layer formed of a material having a polarization property and a protection layer which protects the polarization layer, and it is known that triacetyl cellulose which is generally used to form the protection layer has an optical anisotropy during the fabrication process of the polarizer. The optical anisotropy causes birefringence with respect to the light that passes the liquid crystal display at the time the viewing angle of the liquid crystal display is changed, thereby degrading the viewing angle characteristic. Such degradation increases the luminance in a dark state in case of conducting oblique observation, thus lowering the contrast. The third optical compensator 23 and the fourth optical compensator 24 are provided with such characteristics as to respectively compensate for the optical anisotropies of the first polarizer 31 and the second polarizer 32 respectively adjoining the optical compensators 23 and 24, thereby eliminating the influences of the optical anisotropy of each polarizer on the liquid crystal display 1.

Figure 5A:
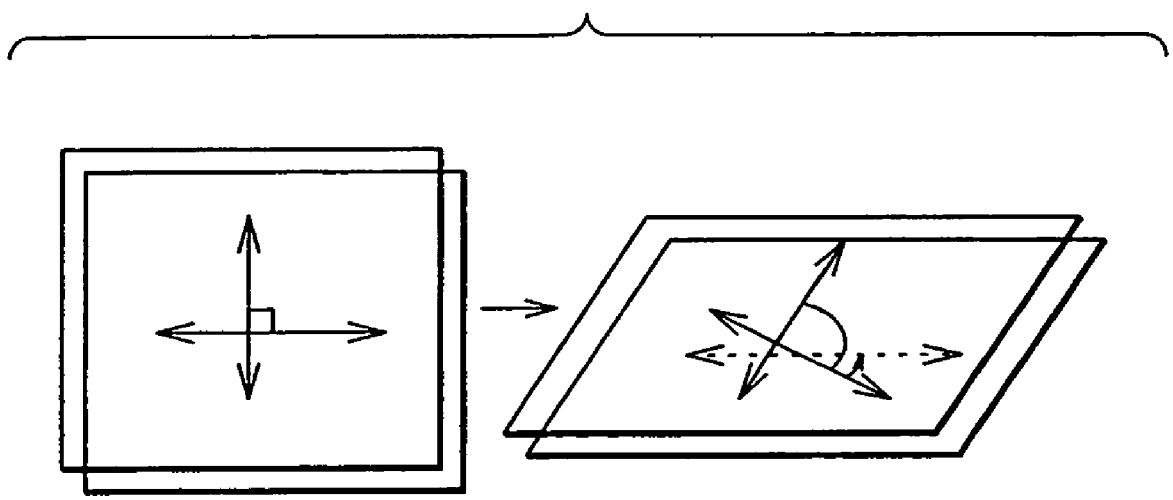
FIGS. 5A and 5B are exemplary diagrams for explaining the functions of optical compensators.
Figure 5B:
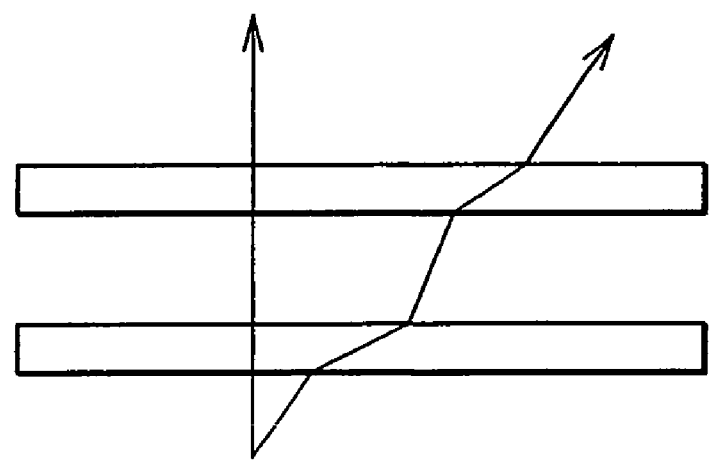

The first optical compensator 21 suppresses the occurrence of the birefringence effect on the LCD panel 10 in a black display state, which is originated from the apparent deviation between the alignment direction and the polarization plane that is caused by oblique observation of the liquid crystal layer 13. The second optical compensator 22 demonstrates an compensation effect such that the apparent polarization plane of light having passed the second polarizer 32 in case of oblique observation is always made parallel to the absorption axis of the first polarizer 31, regardless of the direction of the field of view. FIG. 5A exemplarily shows this effect. The effect suppresses light leakage low, no matter in whichever direction of the field of view an observation is made, so that a change in viewing angle does not result in lower contrast. Further, when the viewing angle is changed, the optical path of transmitted light becomes longer as shown in FIG. 5B, so that the apparent retardation of the liquid crystal layer material or the like becomes greater. As the viewing angle changes, therefore, the wavelength of light which passes through the liquid crystal display 1 changes so that the colors on the screen look changed. The individual optical compensators 21 to 24 intervened in the invention can be constructed in such a way as to compensate for a change in the wavelength of the passing light by adjusting their characteristics. This can also suppress color shifting of the screen when the viewing angle is changed in the black display state.

Figure 6A:
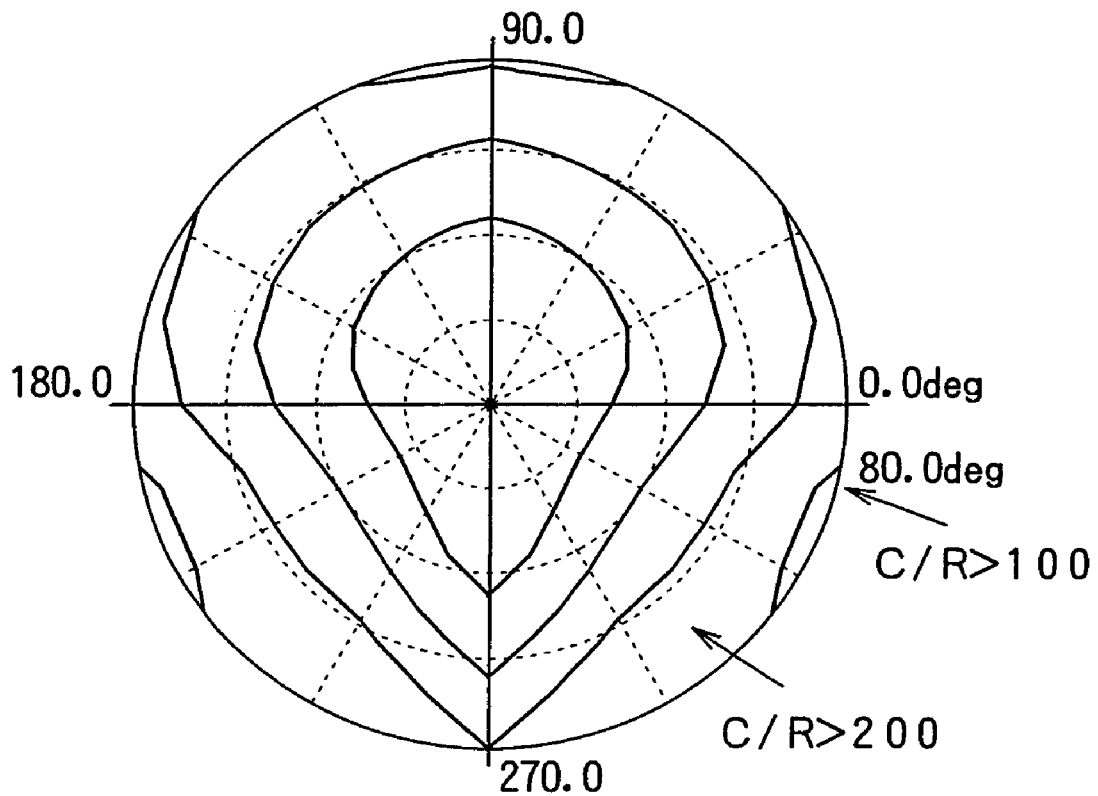
FIGS. 6A and 6B are viewing angle characteristic charts for the contrast and chromaticity according to Example 1 of the first embodiment.
Figure 6B:
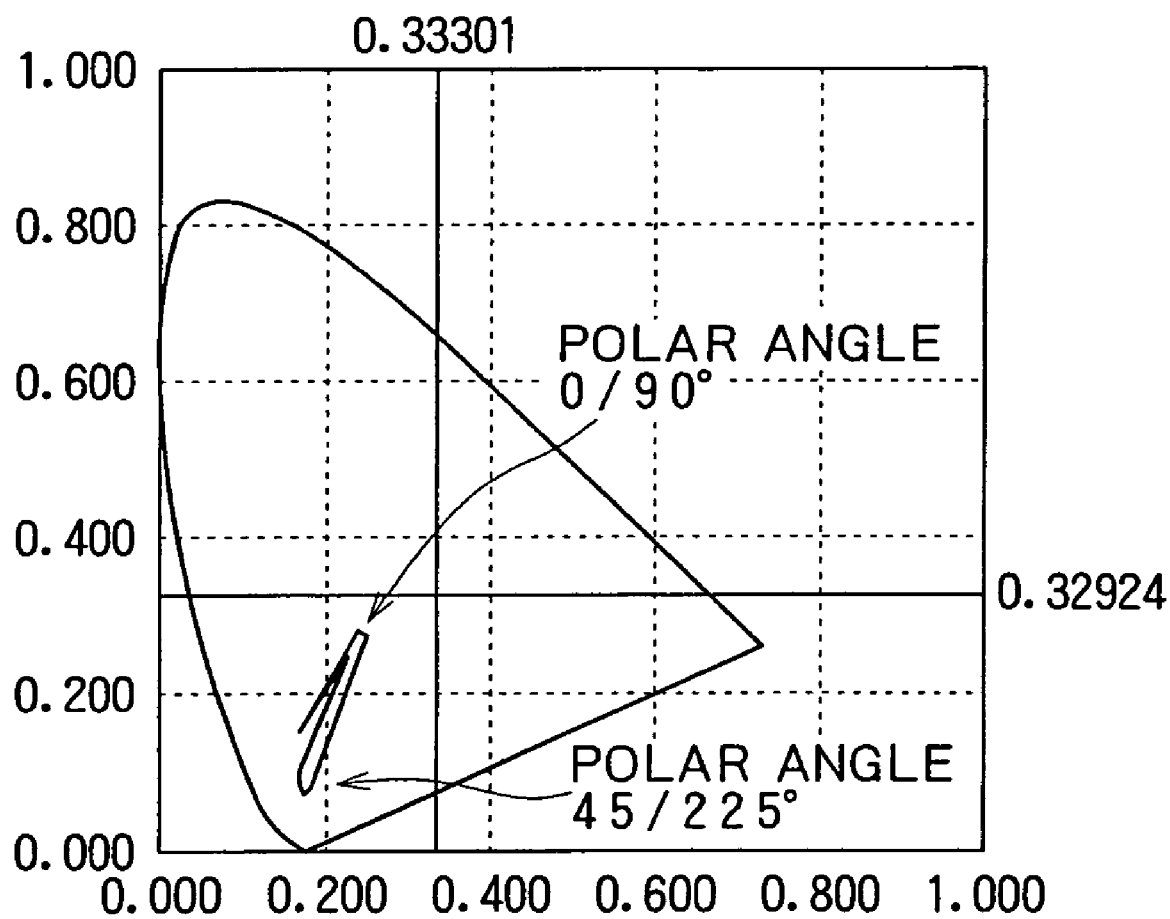

FIG. 6A shows the results of measuring the viewing angle characteristic of the liquid crystal display having the structure in FIGS. 4A and 4B with EZcontrast, a product of ELDIM Company. In the diagram, the contrast ratios are 800, 400, 200, 100, 50, 20, 10, 5 in order from the center. With regard to the viewing angle, the center is the front view field, and concentric circles have viewing angles of 20°, 40°, 60° and 80° in order from the center side. The same is applied to similar diagrams. As apparent from FIG. 6A, it was confirmed that the liquid crystal display having the structure in FIGS. 4A and 4B had a contrast of 100 or higher regardless of the viewing angle. The contrast ratio on the front side was equivalent to the result of a measurement made on the structure of the prior art. FIG. 6B shows the results of similarly measuring the viewing angle characteristic for the chromaticity at the time of displaying black. It was also confirmed from the diagram that a change in chromaticity at the time of having changed the viewing angle was suppressed, thus having suppressed color shifting low. Apparently, the invention can provide an IPS liquid crystal display which improves the contrast ratio in case of making oblique observation without lowering the contrast as obtained when making frontward observation, and prevents color shifting at the time of displaying black.

Studies have been made on the refractive index structures of optical compensators that provide good viewing angle characteristics in case where four optical compensators are used as mentioned above. First, for the optical compensator corresponding to the first optical Compensator 21, the in-plane retardation (nx−ny)d and a parameter (nx−nz)/(nx−ny) indicating the degree of alignment in the thickness direction were respectively set equal to −310 nm and 1.0 in such a way as to compensate for the retardation of the liquid crystal layer 13. At this time, the parameters of the optical compensator corresponding to the second optical compensator 22 were changed and the lowest contrast at a polar angle of 80° was measured. The results of the measurement are shown in FIG. 7. It is apparent from the diagram that the lowest contrast in an oblique field of view would become equal to or greater than 20, showing the effect of the invention, by setting the retardation (nx−ny)d of the second optical compensator 22 in a range of 160 nm to 370 nm and (nx−nz)/(nx−ny) in a range of 0.4 to 0.8.

Figure 8:
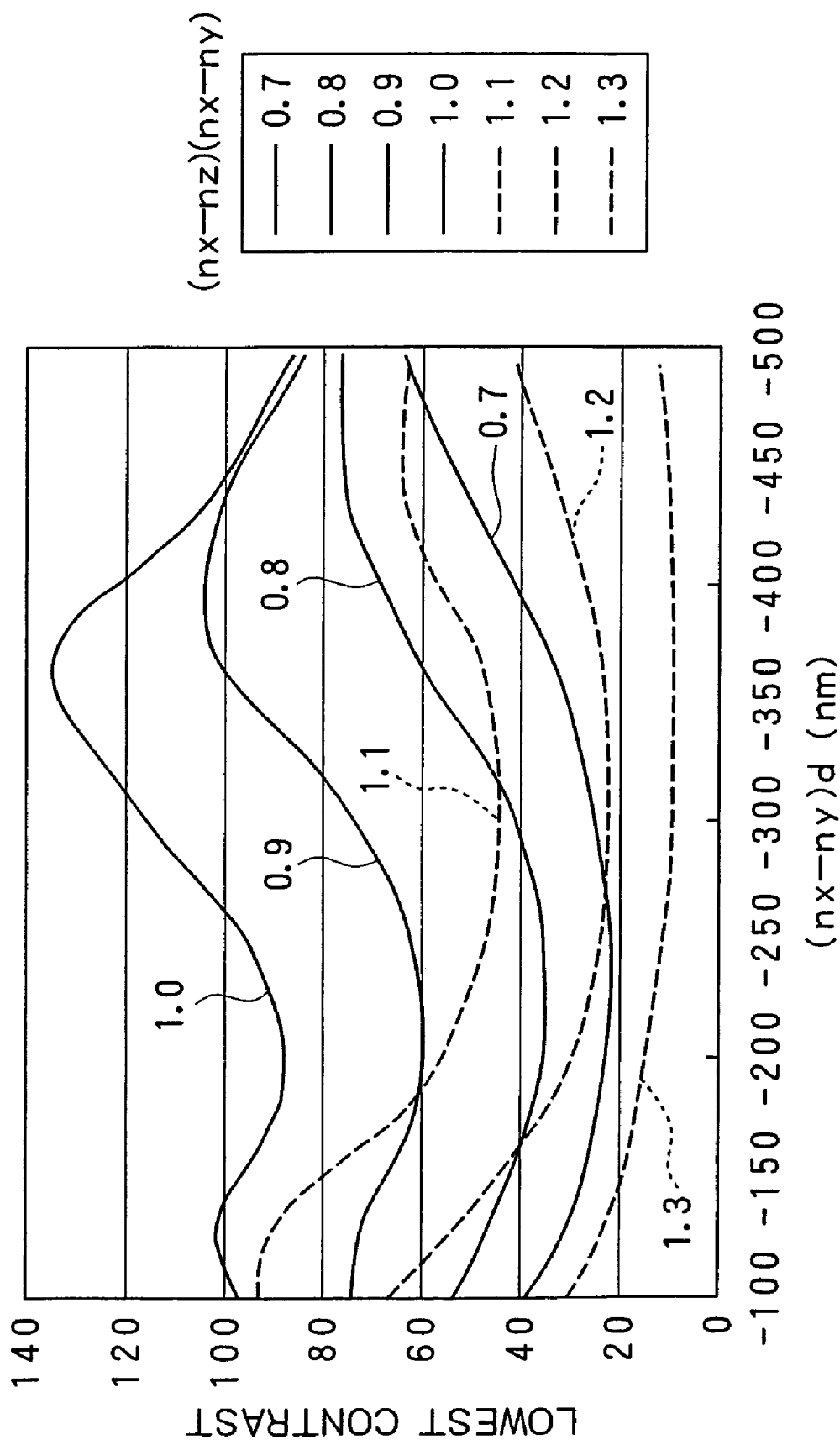
FIG. 8 is another contrast characteristic diagram with retardation as a parameter.

Further, a similar measurement was made while changing the parameters of the first optical compensator 21 with the parameters of the second optical compensator 22 set to (nx−ny)d=270 nm and (nx−nz)/(nx−ny)=0.6 which would show good characteristics in FIG. 7. The results of the measurement are shown in FIG. 8. It is apparent from the diagram that the lowest contrast in an oblique field of view would become equal to or greater than 20, showing the effect of the invention, by setting the retardation (nx−ny)d of the first optical compensator 21 in a range of −100 nm to −500 nm and (nx−nz)/(nx−ny) in a range of 0.7 to 1.2.

Example 2 of First Embodiment

Example 2 of the first embodiment, like Example 1 of the first embodiment, takes a structure similar to the structure of the IPS active matrix type liquid crystal display shown in FIGS. 4A and 4B. As the characteristics of the first optical compensator 21, the retardation (nx−ny)d was set equal to −350 nm and (nx−nz)/(nx−ny) was set equal to 1.4. As the characteristics of the second optical compensator 22, the retardation (nx−ny)d was set equal to 274 nm and (nx−nz)/(nx−ny) was set equal to 0.471. For both of the third optical compensator 23 and the fourth optical compensator 24, the retardation (nx−ny)d was set equal to −6 nm and (nx−nz)/(nx−ny) was set equal to 8.3.

Figure 9:
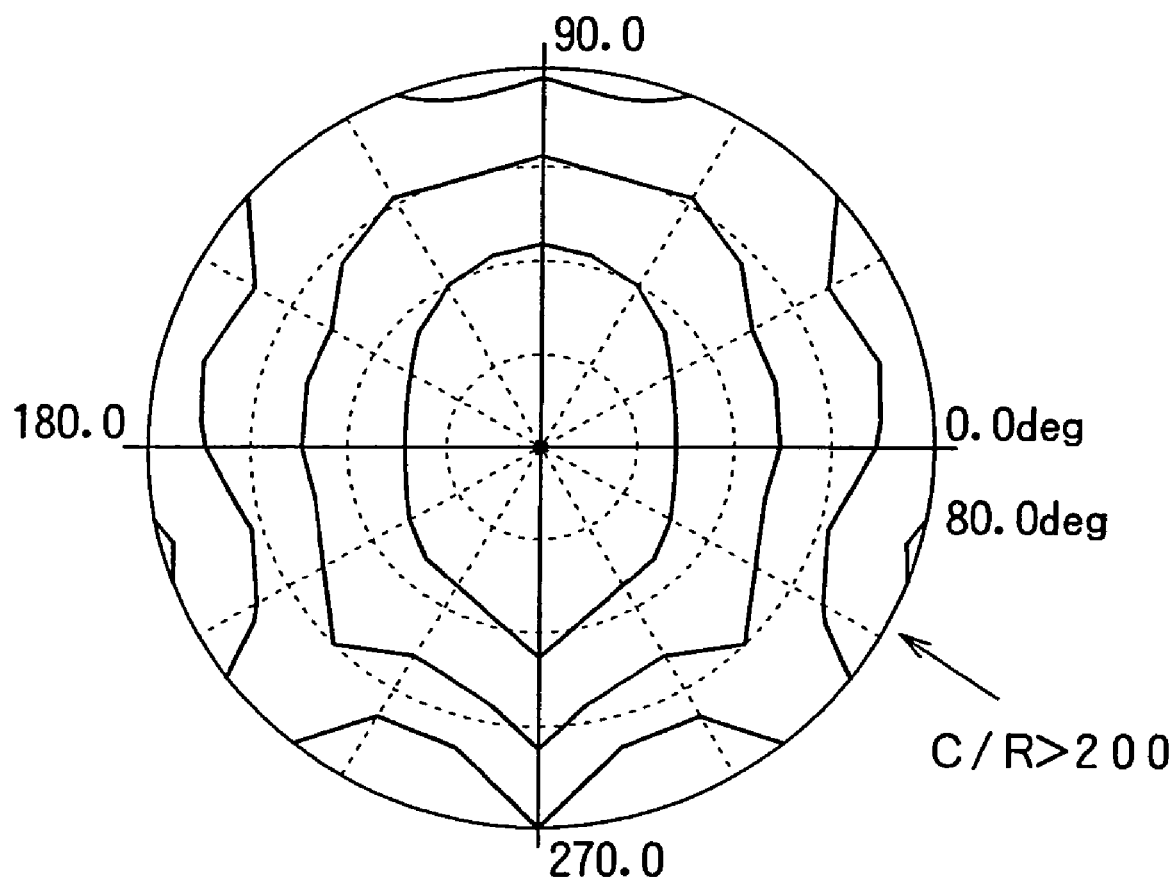
FIG. 9 is a viewing angle characteristic chart for the contrast according to Example 2 of the first embodiment.

The results of measuring the viewing angle characteristic for the contrast of the thus provided liquid crystal display show that the contrast becomes equal to or greater than approximately 200 from any angle of observation as apparent from FIG. 9 and the contrast in case where observation is made from an oblique view field. The contrast ratio on the front side was equivalent to the result of the measurement made on the structure of the prior art.

According to the first embodiment described above, it is preferable that both of the third optical compensator 23 and the fourth optical compensator 24 should have the retardation (nx−ny)d<0 nm and (nx−nz)/(nx−ny)>8.0 as the refractive index structures of the optical compensators that provide good viewing angle characteristics. Alternatively, it is preferable that the third optical compensator 23 and the fourth optical compensator 24 should respectively have (nx−ny)d=0 nm and (nx−ny)d<0 nm. It became apparent that the third optical compensator 23 and the fourth optical compensator 24 should preferably have (nx−ny)d=0 nm and (nx−ny)d<−30 nm, respectively.

Second Embodiment

Example 1 of Second Embodiment

Figure 10A:
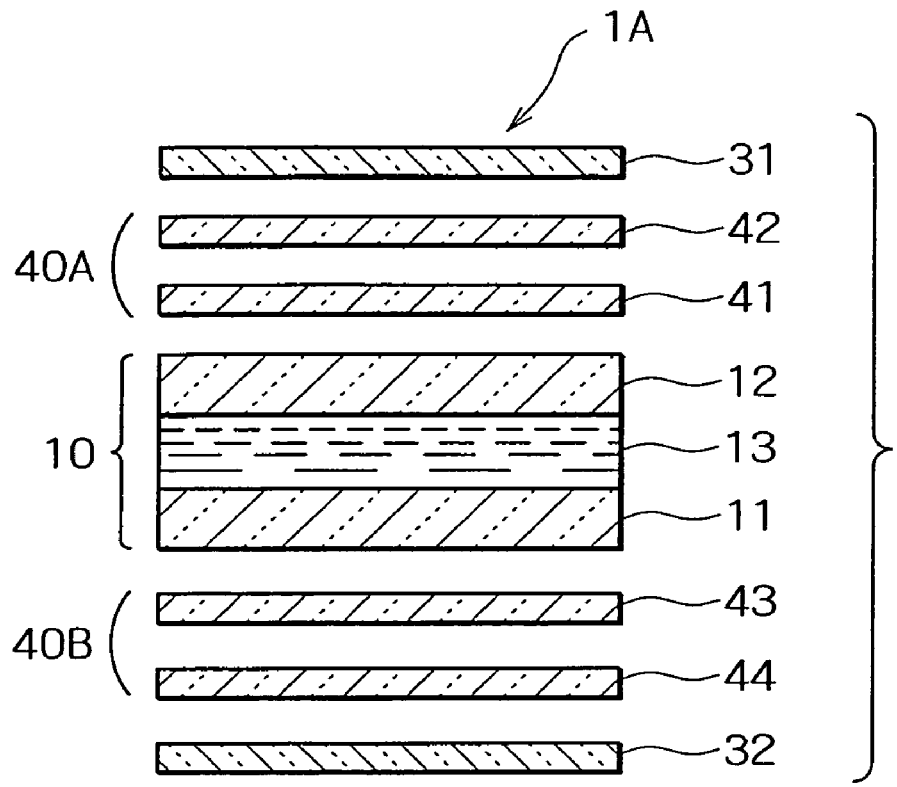
FIGS. 10A and 10B are diagrams exemplarily showing an IPS active matrix type liquid crystal display according to Example 1 of a second embodiment of the invention.
Figure 10B:
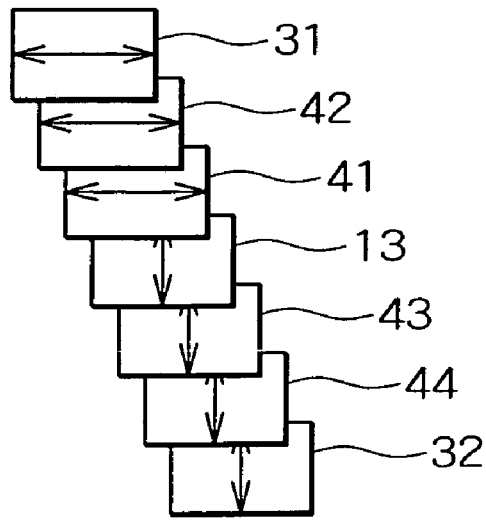

FIGS. 10A and 10B show the structure of a liquid crystal display 1A according to Example 1 of the second embodiment. FIG. 10A is an exemplary diagram showing a lamination structure and FIG. 10B is an exemplary diagram showing the alignment directions and optical axes of individual layers. In those diagrams, same reference symbols are given to those portions which are equivalent to the corresponding portions of the first embodiment. The liquid crystal display 1A comprises the LCD panel 10, a first optical compensator group 40A laid out on the top side of the LCD panel 10, the first polarizer 31 laid out on the top side of the first optical compensator group 40A, a second optical compensator group 40B laid out on the bottom side of the LCD panel 10, and the second polarizer 32 laid out on the bottom side of the second optical compensator group 40B.

The first optical compensator group 40A comprises a first optical compensator 41 laid out on the top side of the LCD panel 10 and a second optical compensator 42 laid out on the top side of the first optical compensator 41. The second optical compensator group 40B comprises a third optical compensator 43 laid out on the bottom side of the LCD panel 10 and a fourth optical compensator 44 laid out on the bottom side of the third optical compensator 43.

The direction of the absorption axis of the first polarizer 31 is set perpendicular to the alignment direction of the liquid crystal layer 13. The direction of the absorption axis of the second polarizer 32 is set parallel to the alignment direction of the liquid crystal layer 13.

As the characteristics of the first optical compensator 41, the retardation (nx−ny)d was set equal to 274 nm and (nx−nz)/(nx−ny) was set equal to 0.471 and the direction of the refractive index nx was set perpendicular to the alignment direction of the liquid crystal layer 13. As the characteristics of the second optical compensator 42, the retardation (nx−ny)d was set equal to −6 nm and (nx−nz)/(nx−ny) was set equal to 8.3 and the direction of the refractive index nx was set parallel to the direction of the absorption axis of the first polarizer 31. As the characteristics of the third optical compensator 43, the retardation (nx−ny)d was set equal to −350 nm and (nx−nz)/(nx−ny) was set equal to 1.14 and the direction of the refractive index nx was set parallel to the alignment direction of the liquid crystal layer 13. As the characteristics of the fourth optical compensator 44, the retardation (nx−ny)d was set equal to −6 nm and (nx−nz)/(nx−ny) was set equal to 8.3 and the direction of the refractive index nx was set parallel to the direction of the absorption axis of the second polarizer 32.

Figure 11:
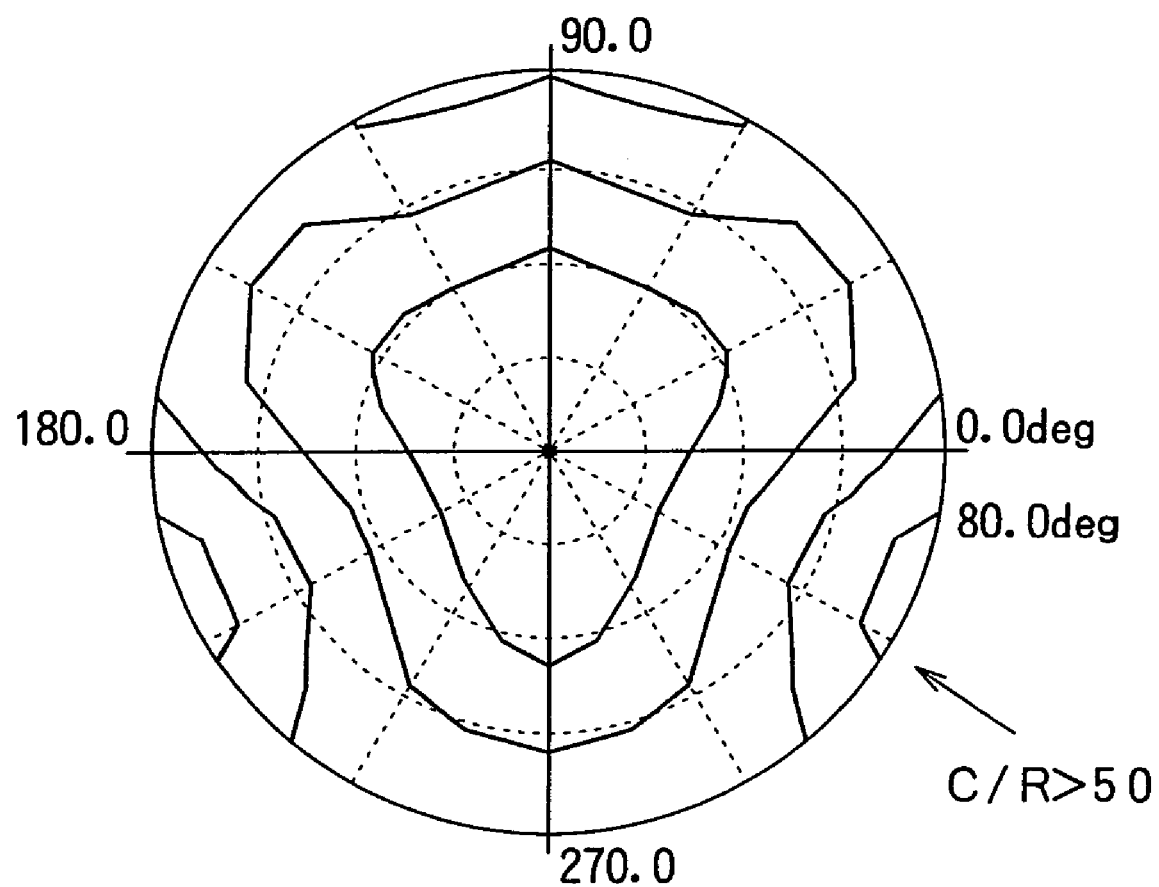
FIG. 11 is a viewing angle characteristic chart for the contrast according to Example 1 of the second embodiment.

The results of measuring the viewing angle characteristic for the contrast of the thus provided liquid crystal display 1A show that the contrast becomes equal to or greater than 50 from any angle of observation as apparent from FIG. 11 and the contrast in case where observation is made from an oblique view field. The contrast ratio on the front side was equivalent to the result of the measurement made on the structure of the prior art.

Example 2 of Second Embodiment

Example 2 of the second embodiment, like Example 1 of the second embodiment, takes a structure similar to the structure of the IPS active matrix type liquid crystal display shown in FIGS. 10A and 10B. As the characteristics of the first optical compensator 41, the retardation (nx−ny)d was set equal to 314 nm and (nx−nz)/(nx−ny) was set equal to 0.538 and the direction of the refractive index nx was set perpendicular to the alignment direction of the liquid crystal layer 13. As the characteristics of the second optical compensator 42, the retardation (nx−ny)d was set equal to −6 nm and (nx−nz)/(nx−ny) was set equal to 8.3 and the direction of the refractive index nx was set parallel to the direction of the absorption axis of the first polarizer 31. As the characteristics of the third optical compensator 43, the retardation (nx−ny)d was set equal to −380 nm and (nx−nz)/(nx−ny) was set equal to 1.05 and the direction of the refractive index nx was set parallel to the alignment direction of the liquid crystal layer 13. As the characteristics of the fourth optical compensator 44, the retardation (nx−ny)d was set equal to −6 nm and (nx−nz)/(nx−ny) was set equal to 8.3 and the direction of the refractive index nx was set parallel to the direction of the absorption axis of the second polarizer 32.

Figure 12A:
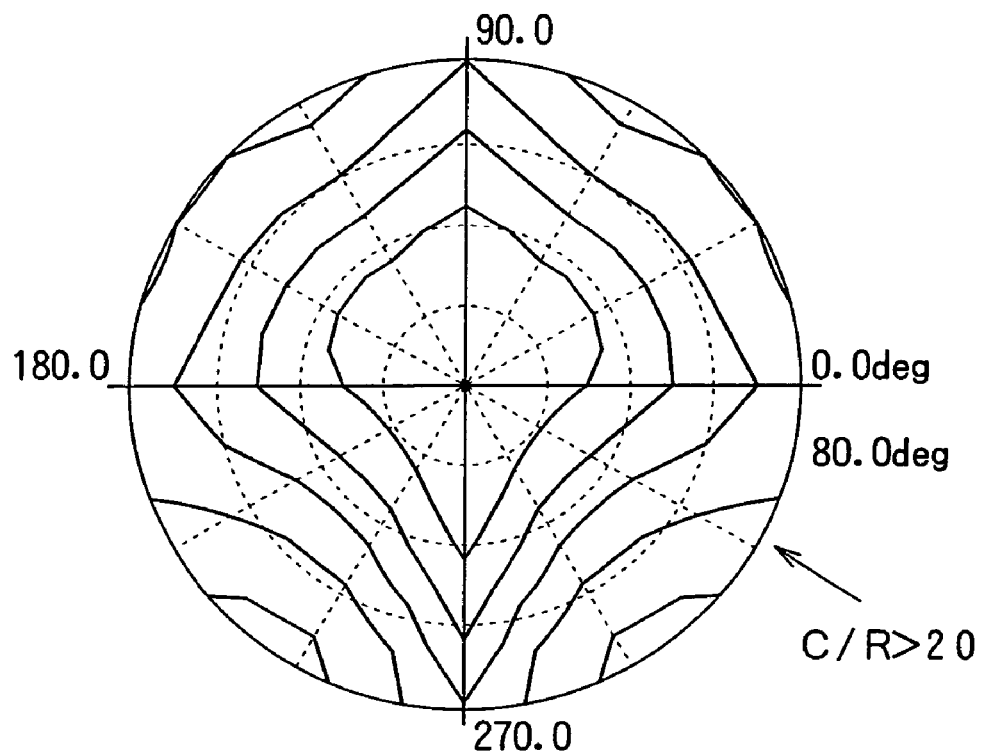
FIGS. 12A and 12B are viewing angle characteristic charts for the contrast and chromaticity according to Example 2 of the second embodiment.
Figure 12B:
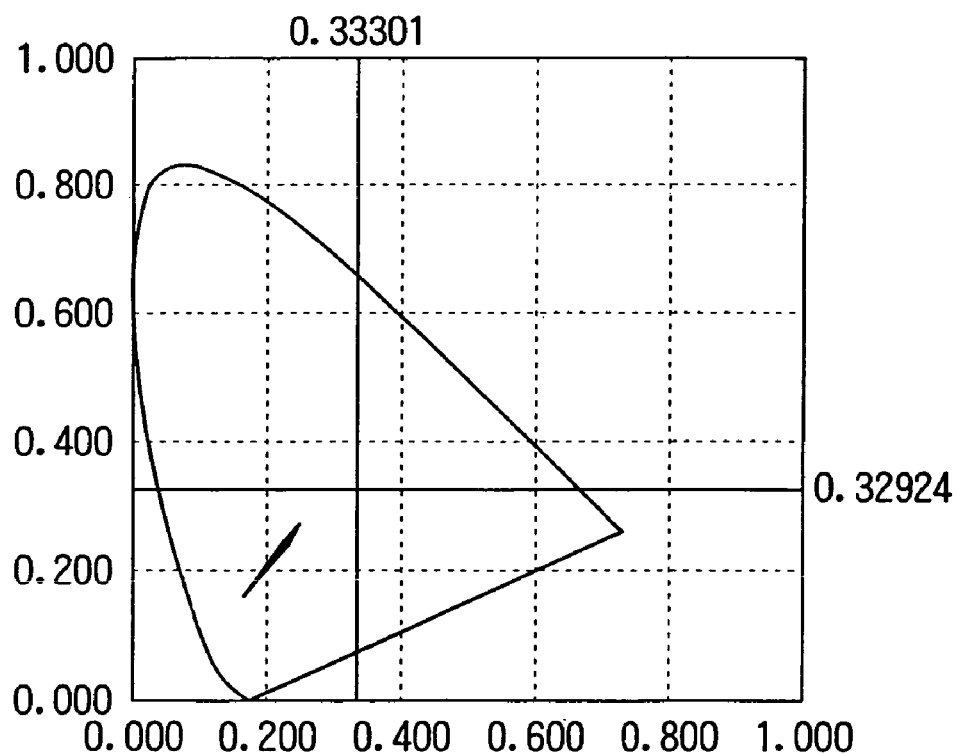

The results of measuring the viewing angle characteristic for the contrast of the thus provided liquid crystal display show that the contrast becomes equal to or greater than 20, irrespective of the viewing angle, as apparent from FIG. 12A and the contrast in case where observation is made from an oblique view field. The contrast ratio on the front side was equivalent to the result of the measurement made on the structure of the prior art. FIG. 12B shows the results of similarly measuring the viewing angle characteristic for the chromaticity at the time of displaying black. It is seen from those diagrams that a change in chromaticity at the time of changing the viewing angle has been suppressed and color shifting has been suppressed low.

It is preferable that the second optical compensator 42 and the fourth optical compensator 44 should have (nx−ny)d<0 nm and (nx−nz)/(nx−ny)>8.0 as the refractive index structures of Examples 1 and 2 of the second embodiment. Alternatively, it is preferable that the second optical compensator 42 and the fourth optical compensator 44 should respectively have (nx−ny)d=0 nm and (nx−ny)d<0 nm. It became apparent that the second optical compensator 42 and the fourth optical compensator 44 should preferably have (nx−ny)d=0 nm and (nx−ny)d<−30 nm, respectively.

Although four optical compensators are used in the first and second embodiments, the functions of plural optical compensators may be integrated into the function of a single optical compensator or the function of a single optical compensator may be separated into a plurality of functions of plural optical compensators. From the viewpoint of fabrication of optical compensators, lamination of multiple films is apt to lower the yield and it is preferable that the number of films to be laminated should be three or less. In this respect, studies have been made on the conditions that provide good viewing angle characteristics with two optical compensators. Examples that satisfy the conditions will be discussed below as the third and fourth embodiments.

Third Embodiment

Example 1-1 of Third Embodiment

Figure 13A:
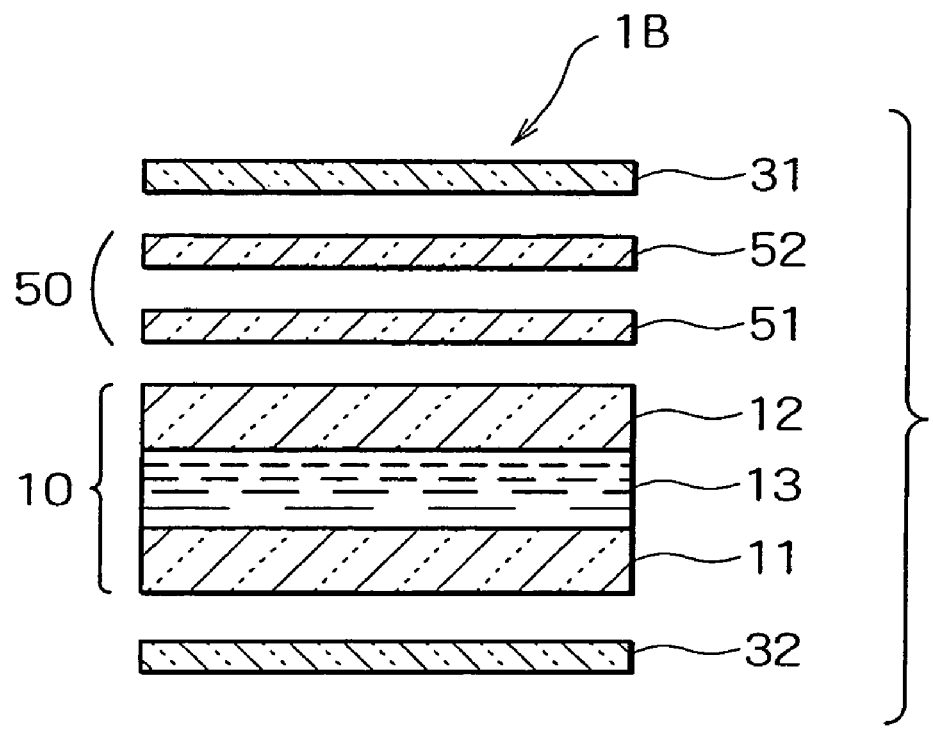
FIGS. 13A and 13B are diagrams exemplarily illustrating the structure of an IPS active matrix type liquid crystal display according to Example 1 of a third embodiment of the invention.
Figure 13B:
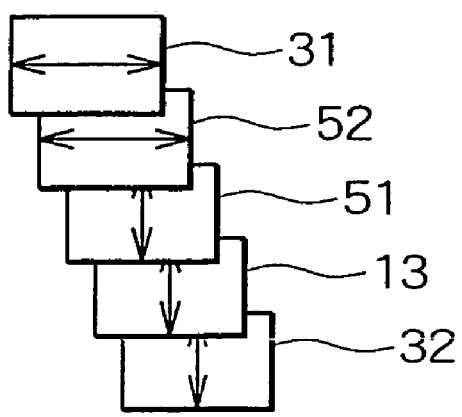

Exemplary diagrams of FIGS. 13A and 13B show the structure of a liquid crystal display 1B according to Example 1-1 of the third embodiment. The liquid crystal display 1B according to the embodiment comprises the LCD panel 10, a first optical compensator group 50 laid out on the top side of the LCD panel 10, the first polarizer 31 laid out on the top side of the first optical compensator group 50, and the second polarizer 32 laid out on the bottom side of the LCD panel 10.

The first optical compensator group 50 comprises a first optical compensator 51 laid out on the top side of the LCD panel 10 and a second optical compensator 52 laid out on the top side of the first optical compensator 51.

The direction of the absorption axis of the first polarizer 31 is set perpendicular to the alignment direction of the liquid crystal layer 13. The direction of the absorption axis of the second polarizer 32 is set parallel to the alignment direction of the liquid crystal layer 13.

As the characteristics of the first optical compensator 51, the retardation (nx−ny)d was set equal to −320 nm and (nx−nz)/(nx−ny) was set equal to 1.00 and the direction of the refractive index nx was set parallel to the alignment direction of the liquid crystal layer 13. As the characteristics of the second optical compensator 52, the retardation (nx−ny)d was set equal to 412 nm and (nx−nz)/(nx−ny) was set equal to 0.774 and the direction of the refractive index nx was set perpendicular to the alignment direction of the liquid crystal layer 13.

When one observes the liquid crystal display 1B with the above-described structure from the front side, with no electric field applied to the liquid crystal layer 13, the optical axes of all of the polarizers 31 and 32, the optical compensators 51 and 52 and the liquid crystal layer 13 are positioned parallel or perpendicular. Therefore, light polarized by the second polarizer 32 reaches the first polarizer 31 without being influenced at all and the polarization plane of the polarized light coincides with the direction of the absorption axis of the first polarizer 31, thus making a dark state. As the optical anisotropy of the polarizer protection layer and the apparent axial angle vary, however, light leaks and the wavelength of passing light varies in the oblique direction, resulting in contrast reduction and coloring. The first and second optical compensators 51 and 52 together serve to compensate for light leakage caused by such factors. The first optical compensator 51 mainly has a birefringence effect in the liquid crystal layer 13 while the second optical compensator 52 has a main effect of compensating for the axial angles of the polarizers 31 and 32.

Figure 14:
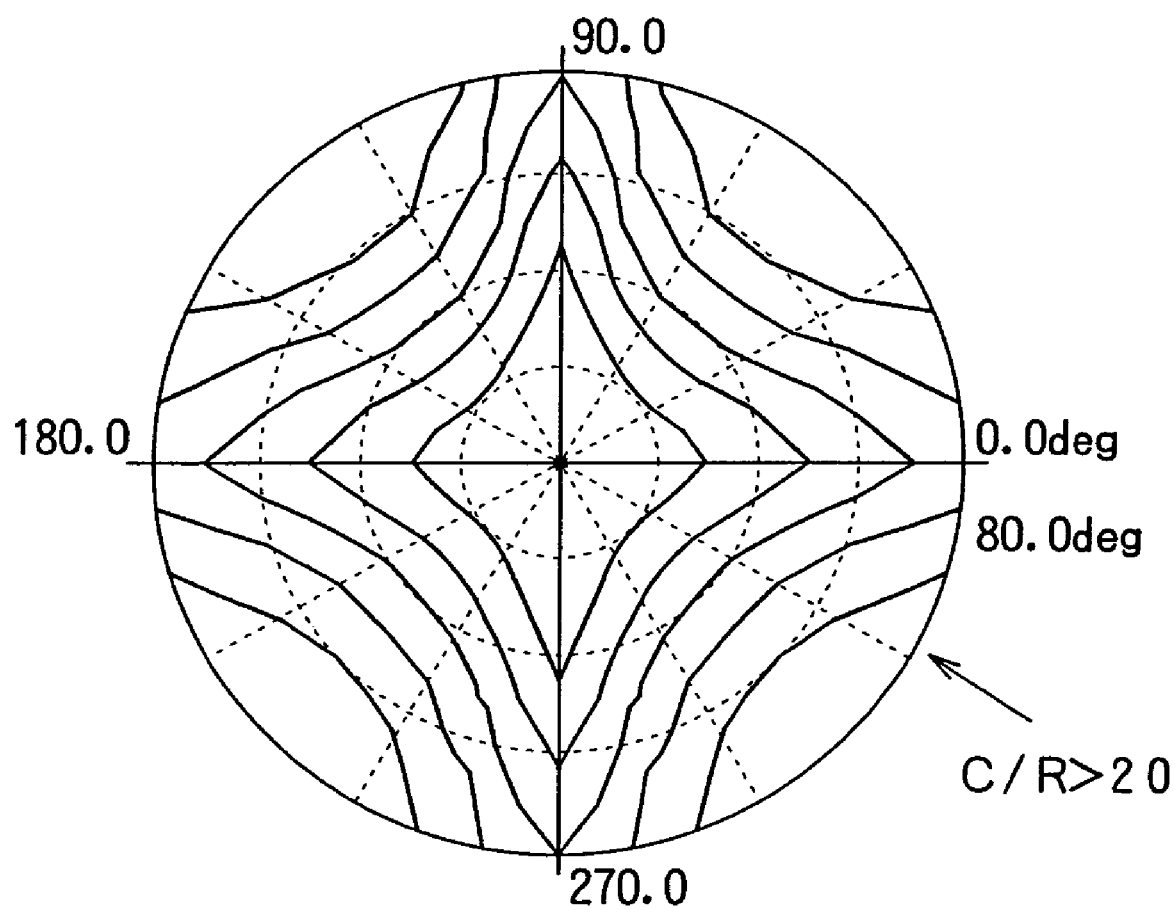
FIG. 14 is a viewing angle characteristic chart for the contrast according to Example 1 of the third embodiment.

The results of measuring the viewing angle characteristic for the contrast of the thus provided liquid crystal display 1B show that the contrast becomes equal to or greater than 20 from any angle of observation as apparent from FIG. 14 and the contrast in case where observation is made from an oblique view field. The contrast ratio on the front side was equivalent to the result of the measurement made on the structure of the prior art.

Example 1-2 of Third Embodiment

Example 1-2 of the third embodiment, like Example 1-1 of the third embodiment, takes a structure similar to the structure of the IPS active matrix type liquid crystal display shown in FIGS. 13A and 13B. As the characteristics of the first optical compensator 51, the retardation (nx−ny)d was set equal to −186 nm and (nx−nz)/(nx−ny) was set equal to 1.14 and the direction of the refractive index nx was set parallel to the alignment direction of the liquid crystal layer 13. As the characteristics of the second optical compensator 52, the retardation (nx−ny)d was set equal to 402 nm and (nx−nz)/(nx−ny) was set equal to 0.537 and the direction of the refractive index nx was set perpendicular to the alignment direction of the liquid crystal layer 13.

Figure 15A:
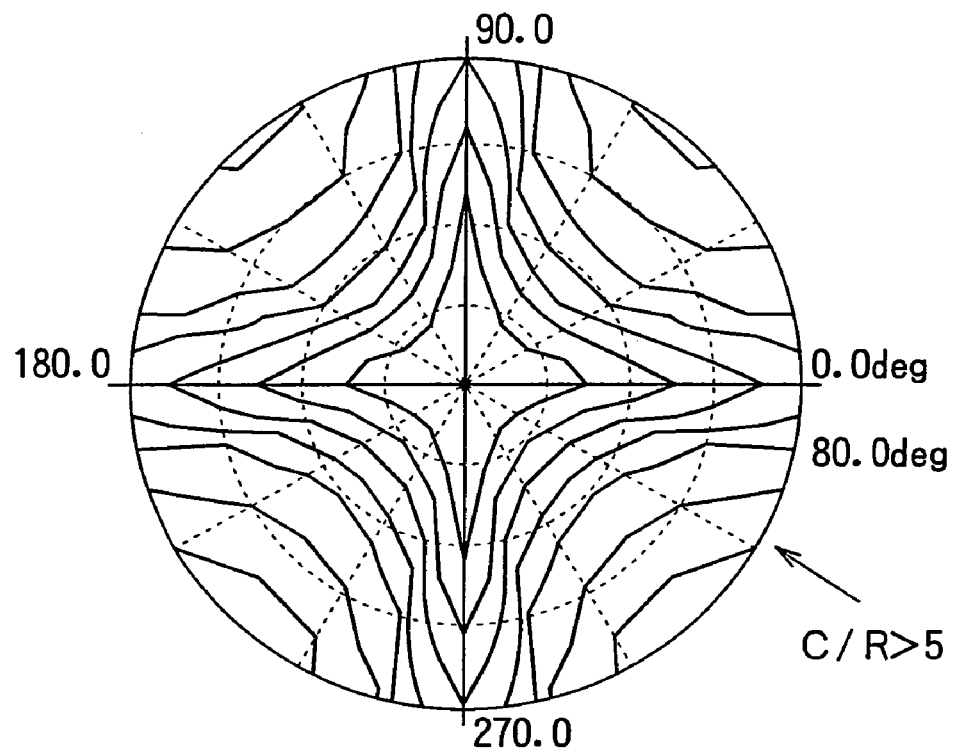
FIGS. 15A and 15B are viewing angle characteristic charts for the contrast and chromaticity according to Example 1 of the third embodiment.
Figure 15B:
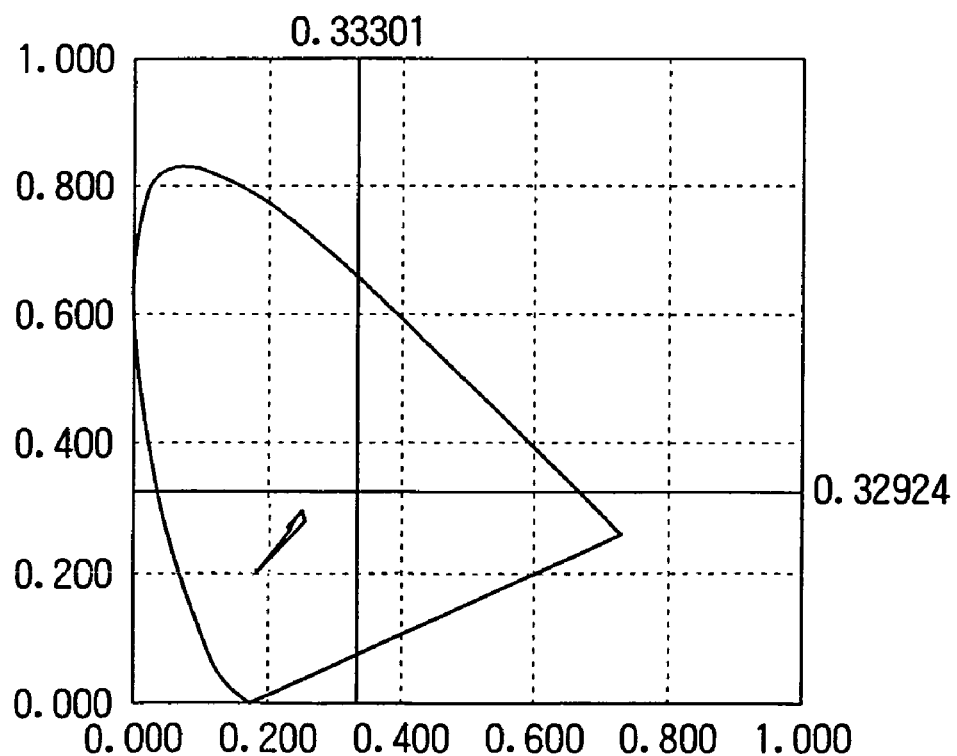
Figure 16A:
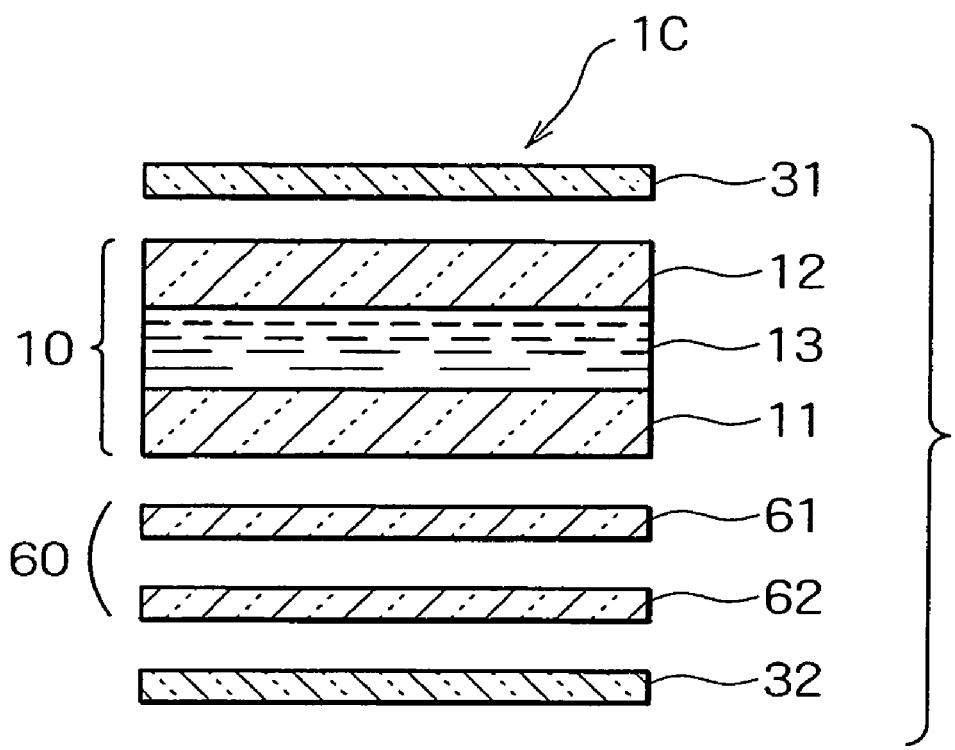
FIGS. 16A and 16B are diagrams exemplarily showing an IPS active matrix type liquid crystal display according to Example 2 of the third embodiment.
Figure 16B:
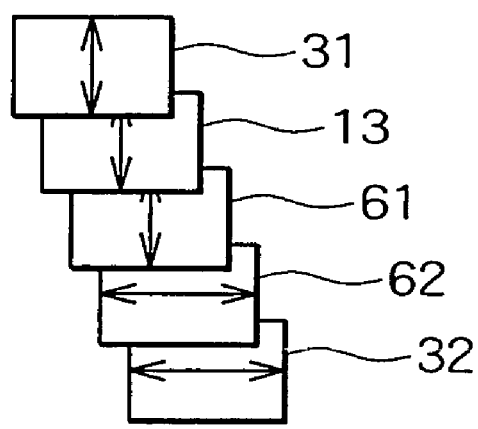

The results of measuring the viewing angle characteristic for the contrast of the thus provided liquid crystal display show that the contrast becomes equal to or greater than 5, irrespective of the viewing angle, as apparent from FIG 15A and the contrast in case where observation is made from an oblique view field. The contrast ratio on the front side was equivalent to the result of the measurement made on the structure of the prior art. FIG. 15B shows the results of similarly measuring the viewing angle characteristic for the chromaticity at the time of displaying black. It is seen from those diagrams that a change in chromaticity at the time of changing the viewing angle has been suppressed and color shifting has been suppressed low.

Example 1-3 of Third Embodiment

Example 1-3 of the third embodiment takes a structure similar to the structure of the IPS active matrix type liquid crystal display illustrated in Examples 1-1 and 1-2 of the third embodiment. As the characteristics of the first optical compensator 51, the retardation (nx−ny)d was set equal to −186 nm and (nx−nz)/(nx−ny) was set equal to 1.3 and the direction of the refractive index nx was set parallel to the alignment direction of the liquid crystal layer 13. As the characteristics of the second optical compensator 52, the retardation (nx−ny)d was set equal to 402 nm and (nx−nz)/(nx−ny) was set equal to 0.7 and the direction of the refractive index nx was set perpendicular to the alignment direction of the liquid crystal layer 13.

The results of measuring the viewing angle characteristic for the contrast of the thus provided liquid crystal display show that the contrast becomes equal to or greater than 5, irrespective of the viewing angle, and the contrast in case where observation is made from an oblique view field. The contrast ratio on the front side was equivalent to the result of the measurement made on the structure of the prior art. The results of similarly measuring the viewing angle characteristic for the chromaticity at the time of displaying black show that a change in chromaticity at the time of changing the viewing angle has been suppressed and color shifting has been suppressed low.

Example 1-4 of Third Embodiment

Example 1-4 of the third embodiment takes a structure similar to the structure of the IPS active matrix type liquid crystal display illustrated in Examples 1-1, 1-2 and 1-3 of the third embodiment. As the characteristics of the first optical compensator 51, the retardation (nx−ny)d was set equal to −186 nm and (nx−nz)/(nx−ny) was set equal to 1.3 and the direction of the refractive index nx was set parallel to the alignment direction of the liquid crystal layer 13. As the characteristics of the second optical compensator 52, the retardation (nx−ny)d was set equal to 402 nm and (nx−nz)/(nx−ny) was set equal to 0.54 and the direction of the refractive index nx was set perpendicular to the alignment direction of the liquid crystal layer 13.

The results of measuring the viewing angle characteristic for the contrast of the thus provided liquid crystal display show that the contrast becomes equal to or greater than 5, regardless of the viewing angle, and the contrast in case where observation is made from an oblique view field. The contrast ratio on the front side was equivalent to the result of the measurement made on the structure of the prior art. The results of similarly measuring the viewing angle characteristic for the chromaticity at the time of displaying black show that a change in chromaticity at the time of changing the viewing angle has been suppressed and color shifting has been suppressed low.

Example 2-1 of Third Embodiment

FIGS. 13A and 13B are exemplary diagrams showing a liquid crystal display 1C according to Example 2-1 of the third embodiment. The liquid crystal display 1C according to Example 2 of the third embodiment, unlike Example 1 of the third embodiment, comprises the LCD panel 10, the first polarizer 31 laid out on the top side of the LCD panel 10, an optical compensator group 60 laid out on the bottom side of the LCD panel 10, and the second polarizer 32 laid out on the bottom side of the optical compensator group 60. The optical compensator group 60 comprises a first optical compensator 61 laid out on the bottom side of the LCD panel 10 and a second optical compensator 62 laid out on the bottom side of the first optical compensator 61.

The direction of the absorption axis of the first polarizer 31 is set parallel to the alignment direction of the liquid crystal layer 13. The direction of the absorption axis of the second polarizer 32 is set perpendicular to the alignment direction of the liquid crystal layer 13.

As the characteristics of the first optical compensator 61, the retardation $(nx-ny)d$ was set equal to $-320$ nm and $(nx-nz)/(nx-ny)$ was set equal to 1.00 and the direction of the refractive index nx was set parallel to the alignment direction of the liquid crystal layer 13. As the characteristics of the second optical compensator 62, the retardation $(nx-ny)d$ was set equal to 412 nm and $(nx-nz)/(nx-ny)$ was set equal to 0.774 and the direction of the refractive index nx was set perpendicular to the alignment direction of the liquid crystal layer 13.

Figure 17:
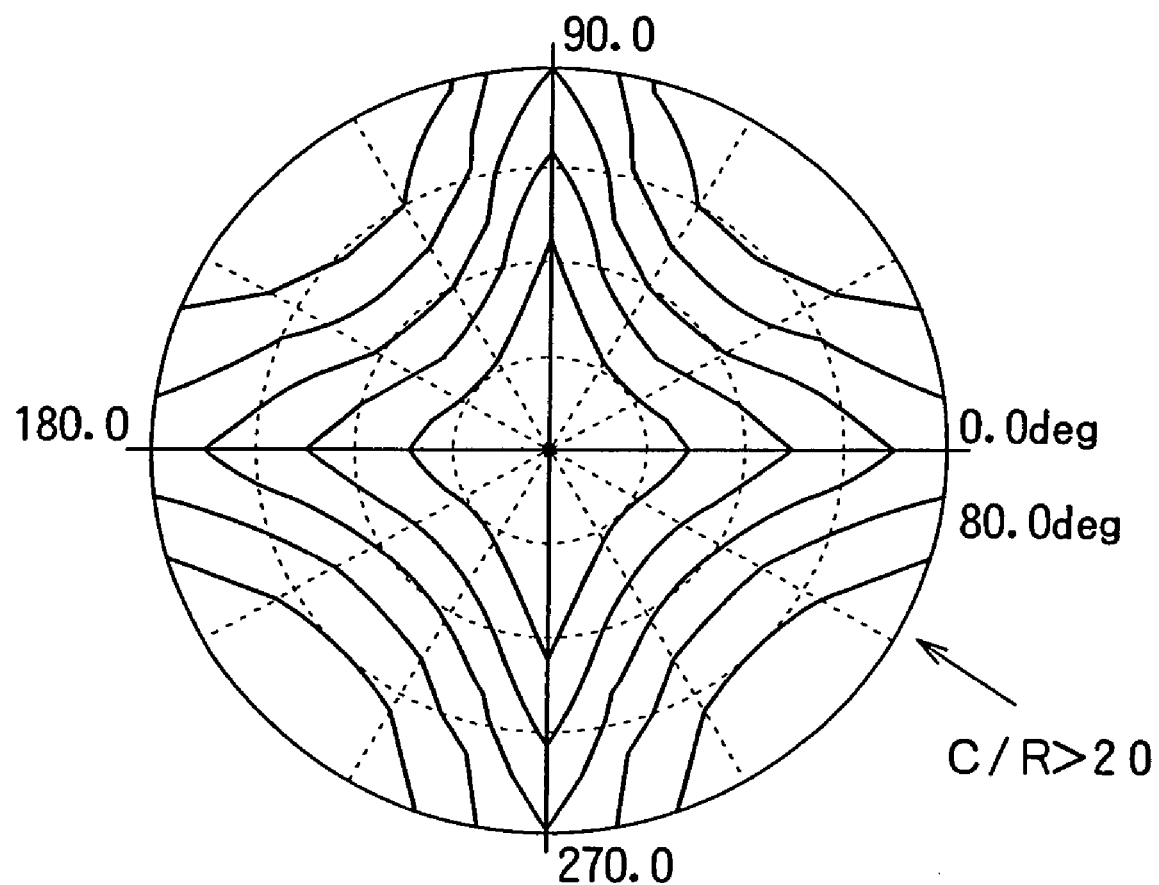
FIG. 17 is a viewing angle characteristic chart for the contrast according to Example 2 of the third embodiment.

The results of measuring the viewing angle characteristic for the contrast of the thus provided liquid crystal display 1C show that the contrast becomes equal to or greater than 20 from any angle of observation as apparent from FIG. 17 and the contrast in case where observation is made from an oblique view field. The contrast ratio on the front side was equivalent to the result of the measurement made on the structure of the prior art.

Example 2-2 of Third Embodiment

Example 2-2 of the third embodiment takes a structure similar to the structure of the IPS active matrix type liquid crystal display illustrated in Example 2-1 of the third embodiment. As the characteristics of the first optical compensator 61, the retardation $(nx-ny)d$ was set equal to $-186$ nm and $(nx-nz)/(nx-ny)$ was set equal to 1.14 and the direction of the refractive index nx was set parallel to the alignment direction of the liquid crystal layer 13. As the characteristics of the second optical compensator 62, the retardation $(nx-ny)d$ was set equal to 402 nm and $(nx-nz)/(nx-ny)$ was set equal to 0.537 and the direction of the refractive index nx was set perpendicular to the alignment direction of the liquid crystal layer 13.

Figure 18A:
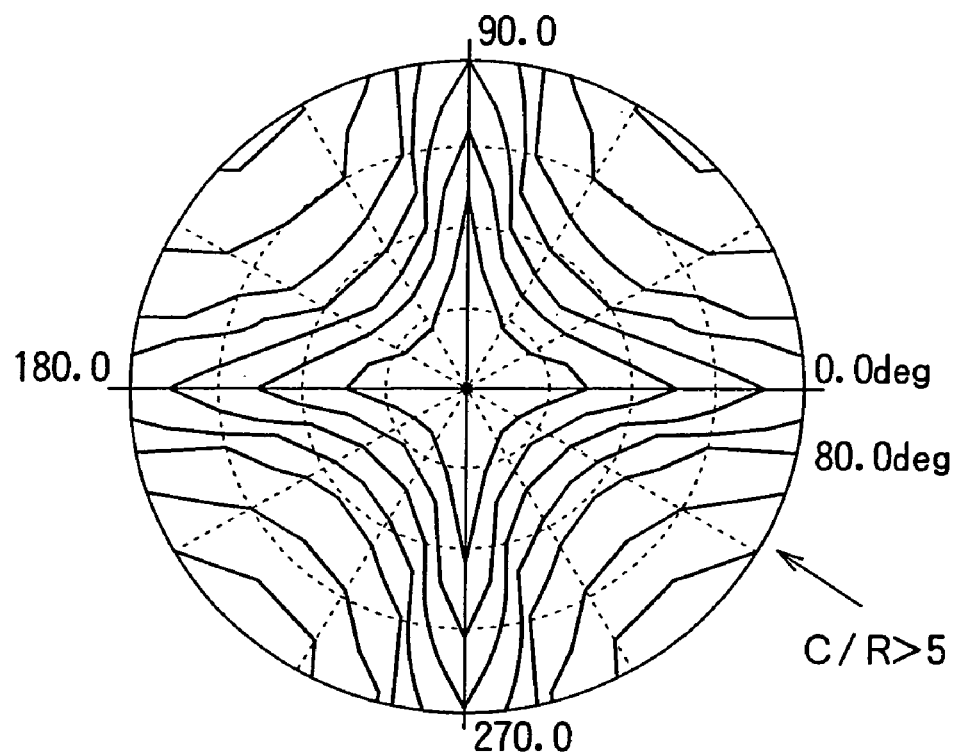
FIGS. 18A and 18B are viewing angle characteristic charts for the contrast and chromaticity according to Example 2 of the third embodiment.
Figure 18B:
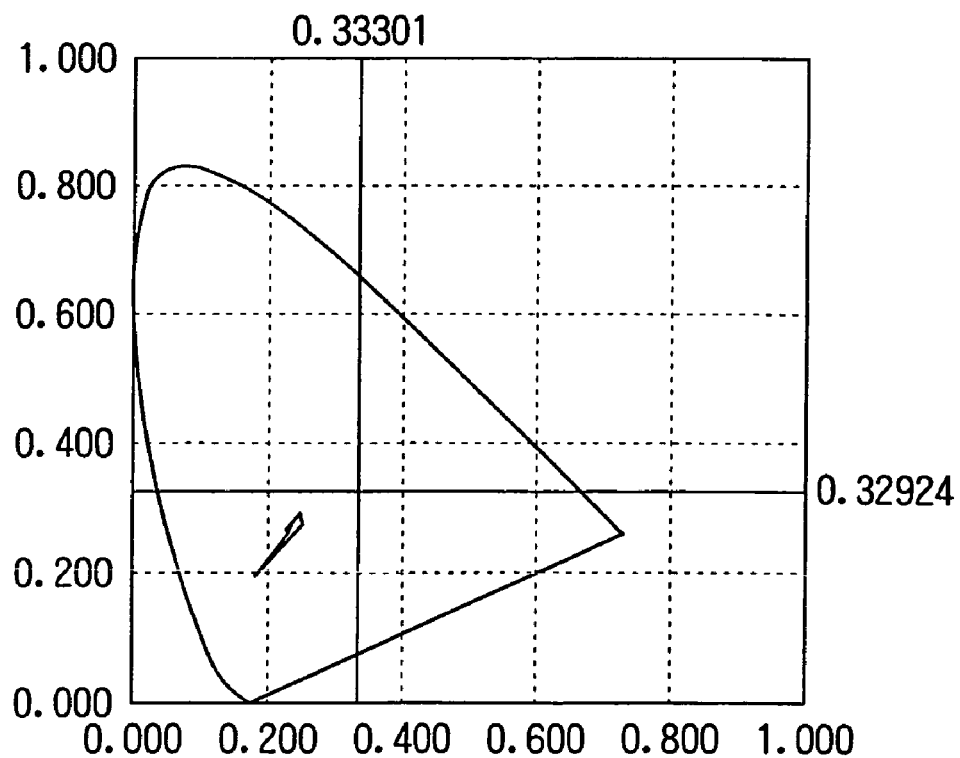

The results of measuring the viewing angle characteristic for the contrast of the thus provided liquid crystal display show that the contrast becomes equal to or greater than 5, irrespective of the viewing angle, as apparent from FIG. 18A and the contrast in case where observation is made from an oblique view field. The contrast ratio on the front side was equivalent to the result of the measurement made on the structure of the prior art. FIG. 18B shows the results of similarly measuring the viewing angle characteristic for the chromaticity at the time of displaying black. It is seen from those diagrams that a change in chromaticity at the time of changing the viewing angle has been suppressed and color shifting has been suppressed low.

Figure 19:
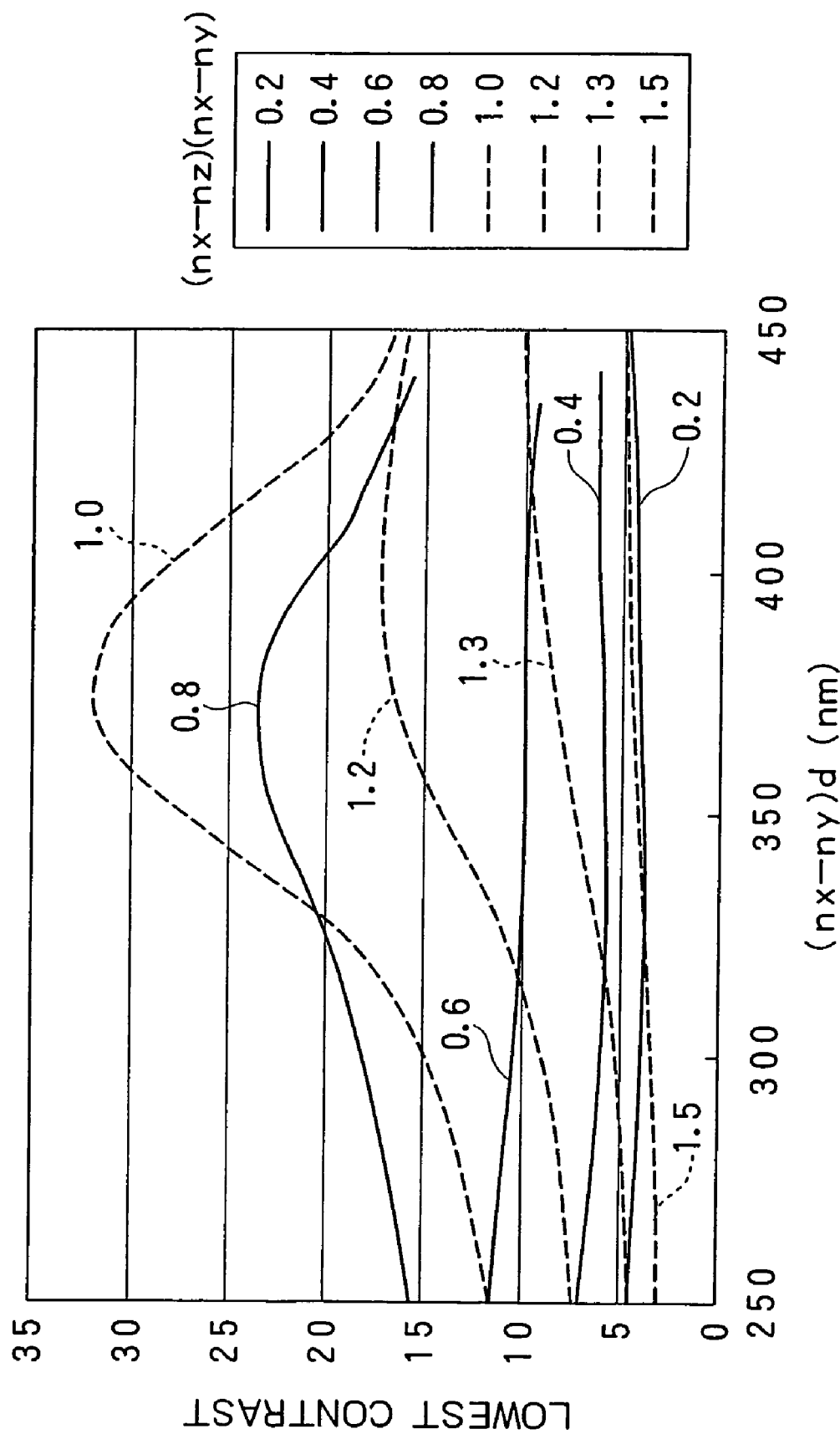
FIG. 19 is a contrast characteristic diagram with retardation as a parameter.
Figure 20:
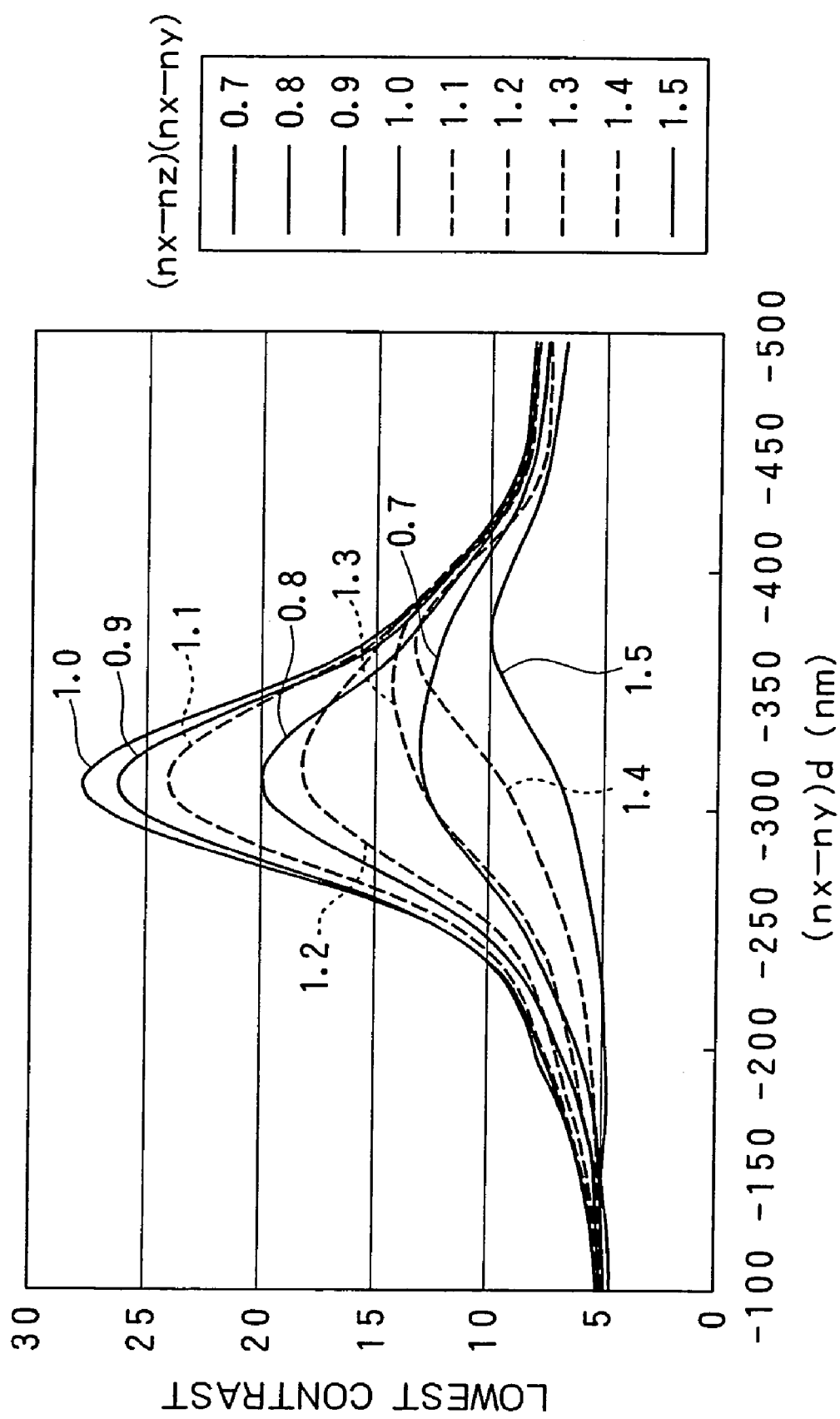
FIG. 20 is another contrast characteristic diagram with retardation as a parameter.

Studies have been made on the refractive index structures of optical compensators that provide good viewing angle characteristics in case of the second embodiment which uses two optical compensators as mentioned above by using a scheme similar to the one discussed earlier. The in-plane retardations $(nx-ny)d$ and parameters Nz $(=(nx-nz)/(nx-ny))$ each indicating the degree of alignment in the thickness direction of the individual optical compensators were changed and were combined, and the contrast and coloring were evaluated. As shown in FIGS. 19 and 20 showing the evaluation results, it is apparent that the lowest contrast in an oblique field of view becomes equal to or greater than 5, showing the effect of the invention, by respectively setting the retardation $(nx-ny)d$ and $(nx-nz)/(nx-ny)$ of one optical compensator in a range of 250 nm to 450 nm and in a range of 0.4 to 1.3, and respectively setting the retardation $(nx-ny)d$ and $(nx-nz)/(nx-ny)$ of the other optical compensator in a range of $-150$ nm to $-500$ nm and in a range of 0.7 to 1.5.

Fourth Embodiment

Example 1 of Fourth Embodiment

Figure 21A:
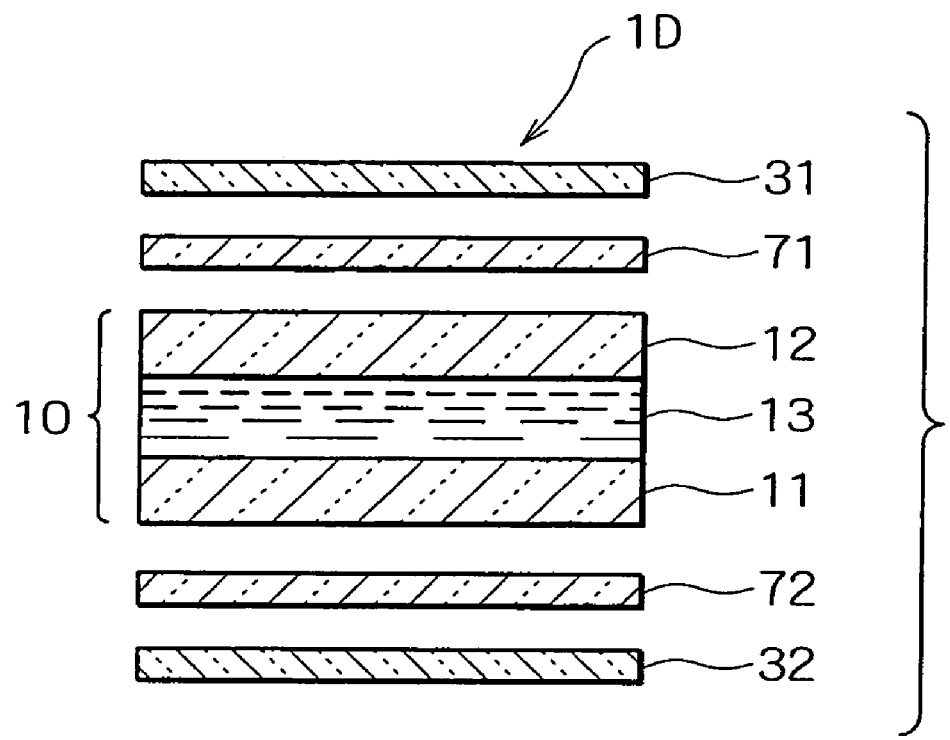
FIGS. 21A and 21B are diagrams exemplary illustrating an IPS active matrix type liquid crystal display according to Example 1 of a fourth embodiment of the invention.
Figure 21B:
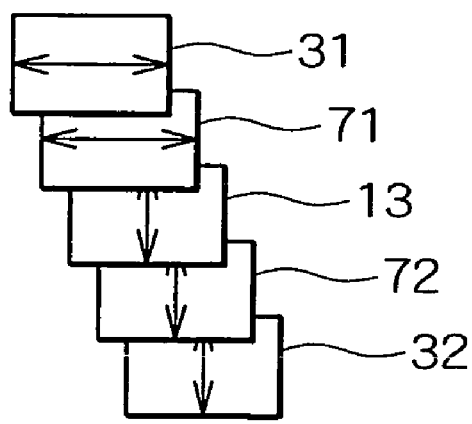

FIGS. 21A and 21B are exemplary diagrams showing a liquid crystal display 1D according to Example 1 of the fourth embodiment. The liquid crystal display 1D according to Example 1 of the fourth embodiment comprises the LCD panel 10, a first optical compensator 71 laid out on the top side of the LCD panel 10, the first polarizer 31 laid out on the top side of the first optical compensator 71, a second optical compensator 72 laid out on the bottom side of the LCD panel 10, and the second polarizer 32 laid out on the bottom side of the second optical compensator 72.

The direction of the absorption axis of the first polarizer 31 is set perpendicular to the alignment direction of the liquid crystal layer 13. The direction of the absorption axis of the second polarizer 32 is set parallel to the alignment direction of the liquid crystal layer 13.

As the characteristics of the first optical compensator 71, the retardation $(nx-ny)d$ was set equal to 412 nm and $(nx-nz)/(nx-ny)$ was set equal to 0.774 and the direction of the refractive index nx was set perpendicular to the alignment direction of the liquid crystal layer 13. As the characteristics of the second optical compensator 72, the retardation $(nx-ny)d$ was set equal to $-320$ nm and $(nx-nz)/(nx-ny)$ was set equal to 1.00 and the direction of the refractive index nx was set parallel to the alignment direction of the liquid crystal layer 13.

Figure 22:
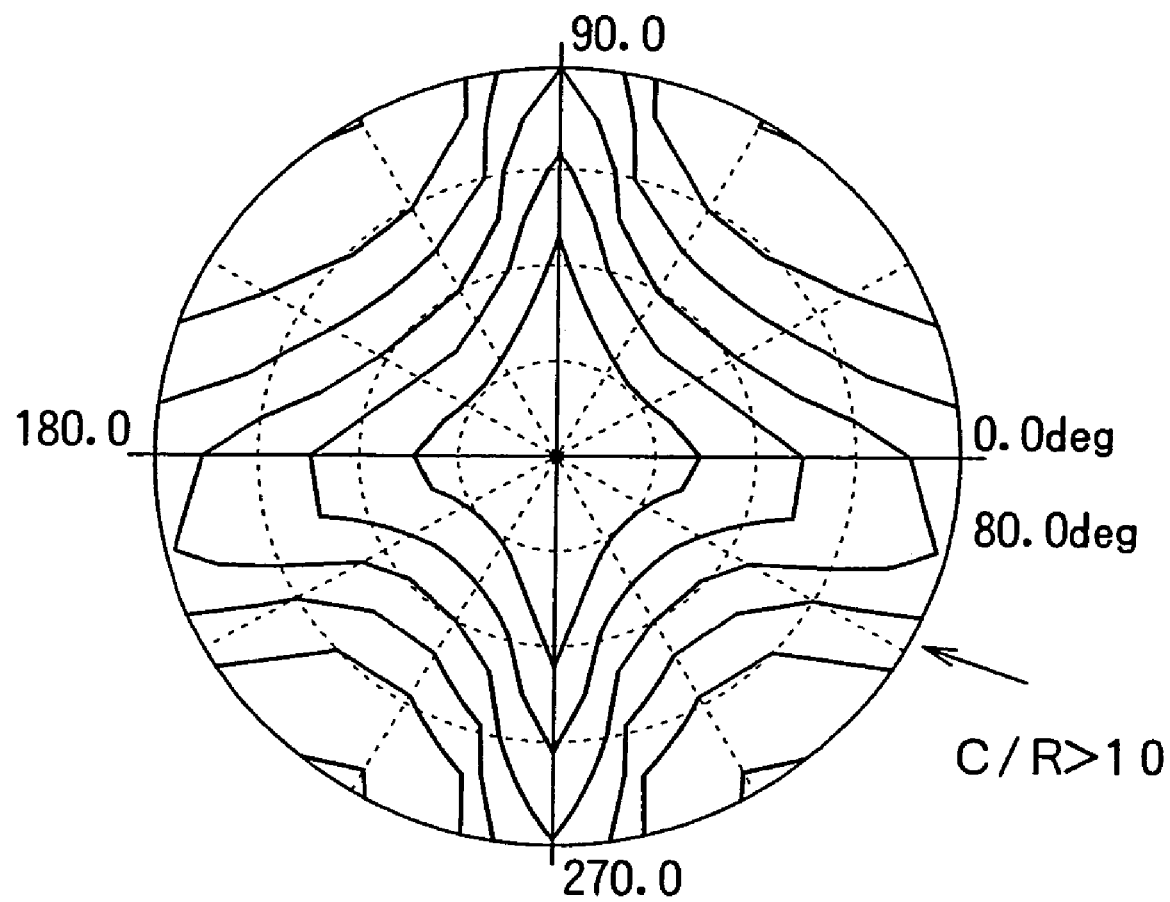
FIG. 22 is a viewing angle characteristic chart for the contrast according to Example 1 of the fourth embodiment.

The results of measuring the viewing angle characteristic for the contrast of the thus provided liquid crystal display 1D show that the contrast becomes equal to or greater than 10 from any angle of observation as apparent from FIG. 22 and the contrast in case where observation is made from an oblique view field. The contrast ratio on the front side was equivalent to the result of the measurement made on the structure of the prior art.

Example 2 of Fourth Embodiment

Example 2 of the fourth embodiment takes a structure similar to the structure of the IPS active matrix type liquid crystal display illustrated in Example 1 of the fourth embodiment. As the characteristics of the first optical compensator 71, the retardation (nx−ny)d was set equal to 402 nm and (nx−nz)/(nx−ny) was set equal to 0.537 and the direction of the refractive index nx was set perpendicular to the alignment direction of the liquid crystal layer 13. As the characteristics of the second optical compensator 72, the retardation (nx−ny)d was set equal to −186 nm and (nx−nz)/(nx−ny) was set equal to 1.14 and the direction of the refractive index nx was set parallel to the alignment direction of the liquid crystal layer 13.

Figure 23A:
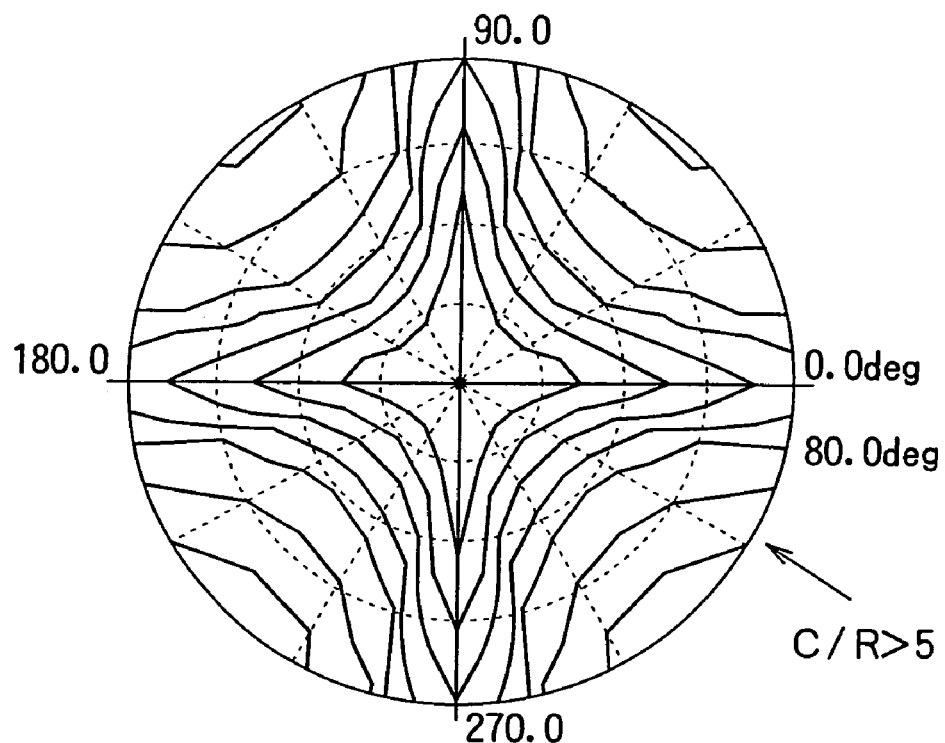
FIGS. 23A and 23B are viewing angle characteristic charts for the contrast and chromaticity according to Example 2 of the fourth embodiment.
Figure 23B:
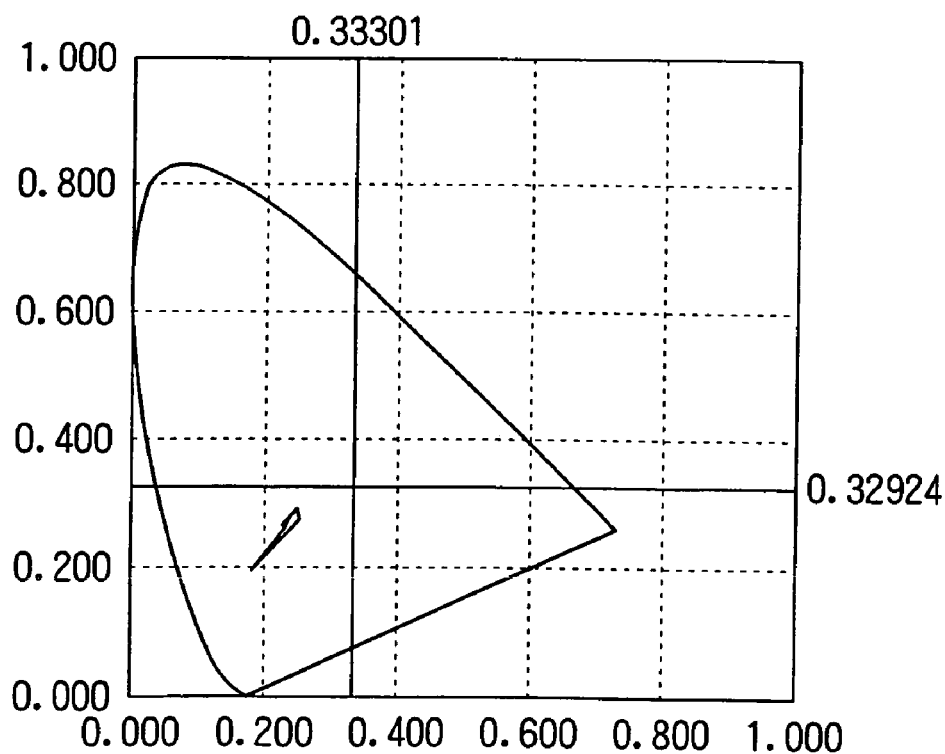

The results of measuring the viewing angle characteristic for the contrast of the thus provided liquid crystal display show that the contrast becomes equal to or greater than 5, regardless of the viewing angle, as apparent from FIG. 23A and the contrast in case where observation is made from an oblique view field. The contrast ratio on the front side was equivalent to the result of the measurement made on the structure of the prior art. FIG. 23B shows the results of similarly measuring the viewing angle characteristic for the chromaticity at the time of displaying black. It is seen from those diagrams that a change in chromaticity at the time of changing the viewing angle has been suppressed and color shifting has been suppressed low.

Although the number of optical compensators is fixed in the foregoing description of the individual embodiments, the effects of plural optical compensators may be integrated into the effect of a single optical compensator, or a single optical compensator may be separated into a plurality of optical compensators in order to demonstrate the optimal effect.

Although the optical axes of the polarizers and optical compensators are fixed to specific directions in the illustrated structures, each optical axis can be set to any direction in accordance with the characteristics and layout positions of the optical compensators, as long as it is parallel to or perpendicular to the alignment direction of the liquid crystal.

According to the invention, as described above, an IPS active matrix type liquid crystal display having an IPS LCD panel and first and second polarizers sandwiching the LCD panel has a single optical compensator or plural optical compensators laid out between the LCD panel and one of both polarizers or between the LCD panel and both polarizers. As those optical compensators, an optical compensator which compensates for retardation of the liquid crystal layer and an optical compensator which compensates for retardation of the polarizers are provided, black stretching does not occur even when observation is made on the active matrix type liquid crystal display from any viewing angle, contrast reduction does not occur and color shifting does not occur at the time of displaying black.

What is claimed is:

1. An active matrix type liquid crystal display, comprising:
an in-plane switching type liquid crystal display panel having an active device substrate, an opposing substrate and a liquid crystal layer held sandwiched between said active device substrate and said opposing substrate;
a first polarizer laid out on one side of said liquid crystal display panel;
a second polarizer laid out on the opposite side of said liquid crystal display panel;
a first optical compensator, placed between said first polarizer and said second polarizer, for compensating for retardation of said liquid crystal layer; and
a second optical compensator, placed between said first polarizer and said second polarizer, for compensating for retardation of said first and second polarizers,
wherein said first polarizer is laid out on an opposing substrate side of said liquid crystal display panel, said first and second optical compensators are laid out in order between said liquid crystal display panel and said first polarizer from a liquid crystal display panel side, and a direction of each of refractive indexes nx of said first and second optical compensators is set parallel to or perpendicular to an alignment direction of said liquid crystal layer.

2. The active matrix type liquid crystal display according to claim 1, wherein an absorption axis of said first polarizer is set perpendicular to said alignment direction of said liquid crystal layer and an absorption axis of said second polarizer is set parallel to said alignment direction of said liquid crystal layer.

3. The active matrix type liquid crystal display according to claim 2, wherein said direction of said refractive index nx of said first optical compensator is set parallel to said alignment direction of said liquid crystal layer, and said direction of said refractive index nx of said second optical compensator is set perpendicular to said alignment direction of said liquid crystal layer.

4. An active matrix type liquid crystal display, comprising:
an in-plane switching type liquid crystal display panel having an active device substrate, an opposing substrate and a liquid crystal layer held sandwiched between said active device substrate and said opposing substrate;
a first polarizer laid out on one side of said liquid crystal display panel;
a second polarizer laid out on the opposite side of said liquid crystal display panel;
a first optical compensator, placed between said first polarizer and said second polarizer, for compensating for retardation of said liquid crystal layer; and
a second optical compensator, placed between said first polarizer and said second polarizer, for compensating for retardation of said first or second polarizers,
wherein said first polarizer is laid out on an opposing substrate side of said liquid crystal display panel, said first and second optical compensators are laid out in order between said liquid crystal display panel and said first polarizer from a liquid crystal display panel side, and a direction of each of refractive indexes nx of said first and second optical compensators is set parallel to or perpendicular to an alignment direction of said liquid crystal layer,
wherein an absorption axis of said first polarizer is set perpendicular to said alignment direction of said liquid crystal layer and an absorption axis of said second polarizer is set parallel to said alignment direction of said liquid crystal layer,
wherein said direction of said refractive index nx of said first optical compensator is set parallel to said alignment direction of said liquid crystal layer, and said direction of said refractive index nx of said second optical compensator is set perpendicular to said alignment direction of said liquid crystal layer, and
wherein said first optical compensator has a retardation (nx−ny)d set within a range of −150nm to −500nm and (nx−nz)/(nx−ny) set within a range of 0.7 to 1.5, and said second optical compensator has a retardation (nx−ny)d set within a range of 250nm to 450nm and (nx−nz)/(nx−ny) set within a range of 0.4 to 1.3 where nx is a refractive index in an x direction in a plane, ny is a refractive index in a y direction in said plane, nz is a refractive index in a thickness direction, and d is a film thickness of each of said optical compensators in a direction perpendicular to a screen.

5. An active matrix type liquid crystal display, comprising:
an in-plane switching type liquid crystal display panel having an active device substrate, an opposing substrate and a liquid crystal layer held sandwiched between said active device substrate and said opposing substrate;
a first polarizer laid out on one side of said liquid crystal display panel;
a second polarizer laid out on the opposite side of said liquid crystal display panel;
a first optical compensator, placed between said first polarizer and said second polarizer, for compensating for retardation of said liquid crystal layer; and
a second optical compensator, placed between said first polarizer and said second polarizer, for compensating for retardation of said first or second polarizers,
wherein said first polarizer is laid out on an opposing substrate side of said liquid crystal display panel, said first and second optical compensators are laid out in order between said liquid crystal display panel and said first polarizer from a liquid crystal display panel side, and a direction of each of refractive indexes nx of said first and second optical compensators is set parallel to or perpendicular to an alignment direction of said liquid crystal layer,
wherein an absorption axis of said first polarizer is set perpendicular to said alignment direction of said liquid crystal layer and an absorption axis of said second polarizer is set parallel to said alignment direction of said liquid crystal layer,
wherein said direction of said refractive index nx of said first optical compensator is set parallel to said alignment direction of said liquid crystal layer, and said direction of said refractive index nx of said second optical compensator is set perpendicular to said alignment direction of said liquid crystal layer, and
wherein said first optical compensator has a retardation (nx−ny)d set equal to −320nm and (nx−nz)/(nx−ny) set equal to 1.00, and said second optical compensator has a retardation (nx−ny)d set equal to 412nm and (nx−nz)/(nx−ny) set equal to 0.774 where nx is a refractive index in an x direction in a plane, ny is a refractive index in a y direction in said plane, nz is a refractive index in a thickness direction, and d is a film thickness of each of said optical compensators in a direction perpendicular to a screen.

6. An active matrix type liquid crystal display, comprising:
an in-plane switching type liquid crystal display panel having an active device substrate, an opposing substrate and a liquid crystal layer held sandwiched between said active device substrate and said opposing substrate;
a first polarizer laid out on one side of said liquid crystal display panel;
a second polarizer laid out on the opposite side of said liquid crystal display panel;
a first optical compensator, placed between said first polarizer and said second polarizer, for compensating for retardation of said liquid crystal layer; and
a second optical compensator, placed between said first polarizer and said second polarizer, for compensating for retardation of said first or second polarizers,
wherein said first polarizer is laid out on an opposing substrate side of said liquid crystal display panel, said first and second optical compensators are laid out in order between said liquid crystal display panel and said first polarizer from a liquid crystal display panel side, and a direction of each of refractive indexes nx of said first and second optical compensators is set parallel to or perpendicular to an alignment direction of said liquid crystal layer,
wherein an absorption axis of said first polarizer is set perpendicular to said alignment direction of said liquid crystal layer and an absorption axis of said second polarizer is set parallel to said alignment direction of said liquid crystal layer,
wherein said direction of said refractive index nx of said first optical compensator is set parallel to said alignment direction of said liquid crystal layer, and said direction of said refractive index nx of said second optical compensator is set perpendicular to said alignment direction of said liquid crystal layer, and
wherein said first optical compensator has a retardation (nx−ny)d set equal to −186nm and (nx−nz)/(nx−ny) set equal to 1.14, and said second optical compensator has a retardation (nx−ny)d set equal to 402nm and (nx−nz)/(nx−ny) set equal to 0.537 where nx is a refractive index in an x direction in a plane, ny is a refractive index in a y direction in said plane, nz is a refractive index in a thickness direction, and d is a film thickness of each of said optical compensators in a direction perpendicular to a screen.

* * * * *